(12) United States Patent
Haartsen

(10) Patent No.: US 7,406,296 B2
(45) Date of Patent: Jul. 29, 2008

(54) CO-LOCATED RADIO OPERATION

(75) Inventor: Jacobus C. Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 444 days.

(21) Appl. No.: 10/888,011

(22) Filed: Jul. 12, 2004

(65) Prior Publication Data
US 2005/0059347 A1 Mar. 17, 2005

Related U.S. Application Data

(60) Provisional application No. 60/496,903, filed on Aug. 22, 2003.

(51) Int. Cl.
H04B 7/00 (2006.01)

(52) U.S. Cl. .................. 455/41.2; 455/41.1; 455/552.1; 455/553.1; 455/419; 370/331; 370/329; 370/350; 370/503

(58) Field of Classification Search ................. 455/450, 455/451, 452.1, 452.2, 454, 41.2, 41.1, 74.1, 455/552.1, 553.1, 419, 272, 101, 129, 277.1, 455/283, 288; 340/445, 450, 465, 337, 347; 370/331, 329, 350, 503, 504
See application file for complete search history.

(56) References Cited

U.S. PATENT DOCUMENTS

| 6,539,204 | B1 | 3/2003 | Marsh et al. | |
|---|---|---|---|---|
| 7,099,671 | B2 * | 8/2006 | Liang | 455/450 |
| 2002/0061031 | A1 * | 5/2002 | Sugar et al. | 370/466 |
| 2002/0093929 | A1 | 7/2002 | Mangold et al. | |
| 2002/0173272 | A1 | 11/2002 | Liang et al. | |
| 2003/0007461 | A1 | 1/2003 | Maeda et al. | |
| 2003/0144020 | A1 * | 7/2003 | Challa et al. | 455/522 |
| 2004/0242159 | A1 * | 12/2004 | Calderon et al. | 455/63.3 |

FOREIGN PATENT DOCUMENTS

| EP | 1 207 654 A | 5/2002 |
|---|---|---|
| WO | WO 01/29984 | 4/2001 |
| WO | WO 02/19743 A2 | 3/2002 |
| WO | WO 02/21769 A | 3/2002 |
| WO | WO 03/019798 A | 3/2003 |
| WO | WO 2004/045082 A | 5/2004 |

OTHER PUBLICATIONS

Microsoft WinHEC: "Wif-Fi™ (802.11b) and Bluetooth™: An Examination of Coexistence Approaches", Apr. 11, 2001.

(Continued)

*Primary Examiner*—Matthew Anderson
*Assistant Examiner*—Tuan A Pham
(74) *Attorney, Agent, or Firm*—Potomac Patent Group PLLC

(57) ABSTRACT

A first radio transceiver is operated in close proximity to a second radio transceiver, even when the first and second radio transceivers operate in accordance with incompatible standards. Operation in this manner includes receiving a first signal that indicates whether the second radio transceiver is idle or busy and receiving a second signal that, when the second radio transceiver is idle, indicates when the second radio transceiver must have access to a second channel. Operation includes determining whether to enable the first radio transceiver to use a first channel based at least on the first signal.

37 Claims, 10 Drawing Sheets

OTHER PUBLICATIONS

Tim Godfrey, "802 and Bluetooth Coexistence Techniques", Presented to Bluetooth Developers Conference, Dec. 11, 2002.

S. Mangold, et al., "Analysis of IEEE 802.11e for QoS Support in Wireless LANs", IEEE Wireless Communications, pp. 40-50, Dec. 2003.

Lansford, Jim et al. "Combined Text for Collaborative Coexistence Mechanism Clause" IEEE P802.15 Wireless Personal Area Networks, 'Online! Nov. 2001, pp. 1-23, XP002311005 Internet' retrieved on Dec. 15, 2004! p. 6-p. 7.

Shellhammer, Steve "Collaborative Coexistence Mechanism: TDMA of Bluetooth and 802.11" IEEE P802.12 Working Group for Wireless Personal Area Networks, 'Online! Jan. 2001, pp. 1-37, XP002311006 Internet' retrieved on Dec. 15, 2004! p. 19.

PCT International Search Report dated Dec. 27, 2004 in connection with International Application No. PCT/EP 2004/008941.

PCT Written Opinion dated Dec. 27, 2004 in connection with International Application PCT/EP 2004/008941.

* cited by examiner

CO-LOCATED RADIO OPERATION

CROSS REFERENCE TO RELATED APPLICATIONS

This application claims the benefit of U.S. Provisional Application No. 60/496,903, filed Aug. 22, 2003, which is hereby incorporated herein by reference in its entirety.

BACKGROUND

The present invention relates to radio communication systems, and more particularly to operating two radio systems that are located in close proximity to one another and that operate in the same radio spectrum.

In the past few decades, progress in radio and Very Large Scale Integrated circuit (VLSI) technology has fostered widespread use of radio communications in consumer applications. Portable devices, such as mobile radio communication devices, can now be produced having acceptable cost, size and power consumption. After the worldwide success of mobile telephony in licensed bands, capacity limitations and huge license fees have spurred an interest in radio applications operating in the unlicensed bands. For the past few years, systems such as Wireless Local Area Networks (WLAN) operating in accordance with the IEEE 802.11 standards (commercialized under the name "WiFi™") and Wireless Personal Area Networks operating in accordance with the Bluetooth® standards (IEEE 802.15 standards) have been increasingly deployed in the unlicensed 2.4 GHz Industrial, Scientific, Medical (ISM) frequency band.

There is a general coexistence problem with radios that operate both in the same area and in the same radio spectrum. If Bluetooth® radios and WLAN radios are operating in close proximity, say within a few meters to a few tens of meters of one another, mutual interference gives rise to degradation of the radio link quality. The following discussion explains why this is so.

The Bluetooth® radio unit is designed to perform frequency hopping over a set of 79 hop carriers that have been defined at a 1 MHz spacing in a frequency band centered at 2.4 GHz. At any given moment, the Bluetooth® radio covers only about 1 MHz of bandwidth. In contrast, WLAN IEEE 802.11b for example uses a static carrier that can be dynamically selected out of 11 carriers, each occupying about 22 MHz of bandwidth. These 11 carries together occupy the same frequency band as is used by the Bluetooth® radio. Consequently, when a Bluetooth® radio and a WLAN 802.11b radio operate in the same area, there is a 22/79 probability that, at any instant of time, the Bluetooth® channel will overlap with the WLAN channel resulting in mutual interference.

Several solutions to this problem exist. One of these, Adaptive Frequency Hopping (AFH), has recently been released by the Bluetooth® Special Interest Group in a draft specification. Using this technique, the Bluetooth® radio can select a number of carrier frequencies that will be skipped during frequency hopping, thereby making them unused for radio communications. An example of an AFH scheme has been described in U.S. patent application Ser. No. 09/418,562 filed on Oct. 15, 1999 by J. C. Haartsen and published as WO0129984. However, with the increased deployment of Bluetooth® connectivity and WLAN IEEE 802.11 ("WLAN 802.11") networks, coexistence has gone to the next level: co-location. By co-location is meant the placement of two radios at very close proximity to one another, for example about 10 cm or less, although this measurement should be construed loosely. Optimally, the two radios are implemented on the same platform and use a common antenna, such as the dual radio embodiment illustrated in FIG. 1. Devices that employ both Bluetooth® wireless technology and WLAN radios include laptop and desktop computers as well as lighter devices such as Personal Digital Assistants (PDAs). In the future, mobile telephones may also incorporate both types of technologies. Concurrent operation of these two types of radios poses a problem because they interfere with each other's transmissions and receptions. In those cases, AFH will not help: due to the small attenuation between the transmitter of one radio and the receiver of the other radio, the interfering signal is so much stronger that it drowns out the received information signal.

One possible method of combating the interference is applying active cancellation of the interfering signal as described in U.S. Pat. No. 6,539,204, which issued to Marsh et al. on Mar. 25, 2003. However, a WLAN transmitter may typically operate at high power levels, such as at +20 dBm, whereas a Bluetooth® receiver will typically be trying to receive incoming Bluetooth® signals at −85 dBm from a remote Bluetooth® unit. When these two units are co-located, the power differences are in the range of 30 to 50 dB, which is impossible to compensate for in active cancellation circuitry.

The only viable method for preventing the co-location interference is applying time division multiplexing (TDM) so that only one radio operates at a time. This results in perfect isolation between the radios. TDM has been investigated for co-located radios before. See, for example, the white paper presented by Mobilian Corporation at WinHEC 2001 entitled "Wi-Fi™ (802.11b) and Bluetooth™: An Examination of Coexistence Approaches", Apr. 11, 2001. In the described approach, a packet arbitration method is provided that operates at the Medium Access Control (MAC) level. The mechanism called MEHTA (which stands for "Mac Enhanced Temporal Algorithm") takes into account the activity and duration of the activity of the two radios. A block diagram of a system implementing this method, also known as Packet Traffic Arbitration or "PTA", is illustrated in FIG. 2. As shown, a WLAN device 201 and a Bluetooth® device 203 are co-located with one another. The WLAN device 201 includes an IEEE 802.11 MAC 205 that communicates with an IEEE 802.11 PLCP+PHY layer control block 207. The Bluetooth® device 203 similarly includes an IEEE 802.15.1 LM+LC block 209 that communicates with an IEEE 802.15.1 baseband controller 211. A PTA controller 213 is provided that determines which of the WLAN and Bluetooth® devices 201, 203 will be permitted to transmit at any given moment. To accomplish this, the PTA controller 213 includes a WLAN (802.11b) control portion 215 and a Bluetooth® (802.15.1) control portion 217 which each receive present status information from each of the WLAN and Bluetooth® devices 201, 203. This present status information indicates the activity and expected time duration of the activity of each of the two radios. When the WLAN device 201 wishes to transmit, it communicates a transmission request 219 to the WLAN control portion 215 and waits for the WLAN control portion 215 to reply with a transmission confirmation 221 before proceeding with the transmission. Similarly, when the Bluetooth® device 203 wishes to transmit, it communicates a transmission request 223 to the Bluetooth® control portion 217 and waits for the Bluetooth® control portion 217 to reply with a transmission confirmation 225 before proceeding with the transmission. Each of the WLAN and Bluetooth® control portions 215, 217 makes its determination whether to permit the requested transmission based upon the totality of status information provided to it.

Although PTA takes into account the real-time conditions at the radio interface, it is a suboptimal solution to the problem of co-located radio devices because it cannot satisfactorily anticipate the needs of priority services, such as voice communication. Rather, it only considers the instantaneous conditions in the considered radios. Consequently, a Bluetooth® priority packet will have to interrupt ongoing WLAN traffic and will result in disturbance of the WLAN link.

An alternative TDM-based method is the Alternating Wireless Medium Access (AWMA) technique. As illustrated in the timing diagram depicted in FIG. 3, the AWMA technique divides time into segments during which the Bluetooth® radio and the WLAN radio are alternately active. However, this setup requires a rather static allocation of the bandwidth between the WLAN and Bluetooth® radios, and can only slowly adapt to changing traffic conditions. Real-time or priority services, such as voice service in accordance with the Bluetooth® standards, cannot be supported. Another drawback is that the WLAN 802.11 specification would have to be modified in order to add a field in the WLAN beacon specific to the AWMA mechanism. In addition, synchronization between the WLAN and the Bluetooth® link is required, which is only feasible when the Bluetooth® unit co-located on the platform acts as a master. The latter is a severe limitation because the co-located Bluetooth® radio may just as likely be allocated the slave role. AWMA as well as PTA are described in a presentation held by Intersil entitled Tim Godfrey, "802.11 and Bluetooth Coexistence Techniques", presented to Bluetooth Developers Conference Dec. 11, 2002. In this presentation, another technique was proposed called Blue802™. In this technique, the power save mode in the 802.11 standard is used. When the Bluetooth® radio needs bandwidth, the Bluetooth® terminal informs the WLAN Access Point (AP) that it will enter the sleep mode. Again, this is not a suitable solution if the Bluetooth® terminal needs to support priority services, such as voice communication, because the 802.11 system cannot be put to sleep for every Bluetooth® voice packet.

It is therefore desirable to provide a mechanism that allows two incompatible transceivers, such as a Bluetooth® radio and a WLAN IEEE 802.11 radio, to coexist in close proximity (e.g., on the same platform, possibly using the same antenna). It is also desirable to provide such a mechanism in which undisturbed real-time services, such as voice communication, are supported on one transceiver's link (e.g., the Bluetooth® link), while keeping high efficiency in best-effort services being carried on the other transceiver's link (e.g., the WLAN link). It is yet further desirable for any such mechanism to not require changes in the specifications for either transceiver (e.g., the specifications of the WLAN and Bluetooth® transceivers).

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

A first radio transceiver is operated in close proximity to a second radio transceiver. In preferred embodiments, this is possible even when the first and second radio transceivers operate in accordance with first and second standards, respectively. An example of incompatible standards is the Bluetooth® wireless technology standard and the IEEE 802.11 (WLAN) technology standard. In one aspect, operation in this manner includes receiving a first signal that indicates whether the second radio transceiver is idle or busy and receiving a second signal that, when the second radio transceiver is idle, indicates when the second radio transceiver must have access to a third channel. Operation includes determining whether to enable the first radio transceiver to use a first channel based on at least the first signal. This sharing mechanism is especially useful when the first channel and the second channel occupy a same radio frequency spectrum. In some embodiments, the first and second channels are the same as one another.

In another aspect, determining whether to enable the first radio transceiver to use the first channel is based on at least the first and second signals.

In another aspect, determining whether to enable the first radio transceiver to use the first channel based on at least the first signal comprises enabling the first radio transceiver to use the first channel only when the first signal indicates that the second radio transceiver is idle and use of the first channel by the first radio transceiver will at no point be concurrent with a moment in time indicated by the second signal as being when the second radio transceiver must have access to the second channel.

In some embodiments, the second signal specifies a first future value of a clock. Alternatively, the second signal can specify a first time offset value.

In another aspect, operation of the first radio transceiver includes relinquishing access to the first channel; and generating a third signal that indicates that the first radio transceiver is idle.

In still another aspect, a fourth signal is generated that indicates when the first radio transceiver must again have access to the first channel.

In yet another aspect, operation of the first radio transceiver includes, prior to a time indicated by the fourth signal as being when the first radio transceiver must have access to the first channel, detecting that the first signal indicates that the second radio transceiver is idle, and in response thereto performing: ensuring that the third signal indicates that the first radio transceiver is busy; and enabling the first radio transceiver to access the first channel.

In still another aspect, operation of the first radio transceiver includes generating a third signal that indicates that the first radio transceiver is busy; enabling the first radio transceiver to utilize the first channel; and detecting that further use of the first channel by the first radio transceiver cannot be completed before a moment in time indicated by a second signal as being when the second radio transceiver must have access to the second channel, and in response to said detection, performing: relinquishing access to the first channel; ensuring that the third signal indicates that the first radio transceiver is idle; and generating a fourth signal that indicates when the first radio transceiver must again have access to the first channel.

In yet another aspect, operation of the first radio transceiver includes, in response to detecting that the first signal indicates that the second radio transceiver is idle, determining whether the second signal should be considered when determining whether to enable the first radio transceiver to use the first channel. In some embodiments, determining whether the second signal should be considered when determining whether to enable the first radio transceiver to use the first channel comprises comparing the second signal to a predetermined value. Alternatively, determining whether the second signal should be considered when determining whether to enable the first radio transceiver to use the first channel comprises using an active-indicating signal as an indicator of whether the second signal should be considered when determining whether to enable the first radio transceiver to use the first channel, wherein the active-indicating signal indicates whether the second signal is active.

In still another aspect, operation of the first radio transceiver includes, in response to determining that the second signal should not be considered when determining whether to enable the first radio transceiver to use the first channel, using a timer to determine when the first radio transceiver will relinquish use of the first channel.

In still another aspect, operation of the first radio transceiver includes generating a third signal that indicates whether the first transceiver is idle or busy; and, in response to the first radio transceiver being idle while engaged in best-effort traffic, indicating to the second radio transceiver a fourth signal is not active, wherein when the first radio transceiver is idle, the fourth signal, when active, indicates when the first radio transceiver must have access to a first channel.

In another aspect, a third signal is generated that indicates whether the first transceiver is idle or busy; a fourth signal is generated that, when the first radio transceiver is idle, indicates when the first radio transceiver must have access to a first channel; and the first radio transceiver is engaged in communication of isochronous traffic that permits each data exchange to occur at any of a predetermined plurality of moments within a corresponding window of time, wherein generating the fourth signal includes determining when a last occurring one of the predetermined plurality of moments within an upcoming window of time will occur.

In yet another aspect, operation of the first radio transceiver includes detecting that the first signal indicates that the second radio transceiver is busy, and in response thereto remaining idle during a non-last occurring one of the predetermined plurality of moments within the upcoming window of time, wherein a data exchange in a subsequently occurring one of the predetermined plurality of moments within the upcoming window of time is carried out in accordance with one or more predefined retransmission procedures.

BRIEF DESCRIPTION OF THE DRAWINGS

The objects and advantages of the invention will be understood by reading the following detailed description in conjunction with the drawings in which.

DETAILED DESCRIPTION

Figure 1:
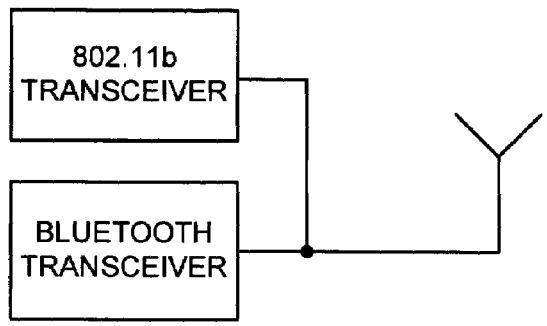
FIG. 1 is a block diagram illustrating two radio transceivers located in the same device and sharing the same antenna.
Figure 2:
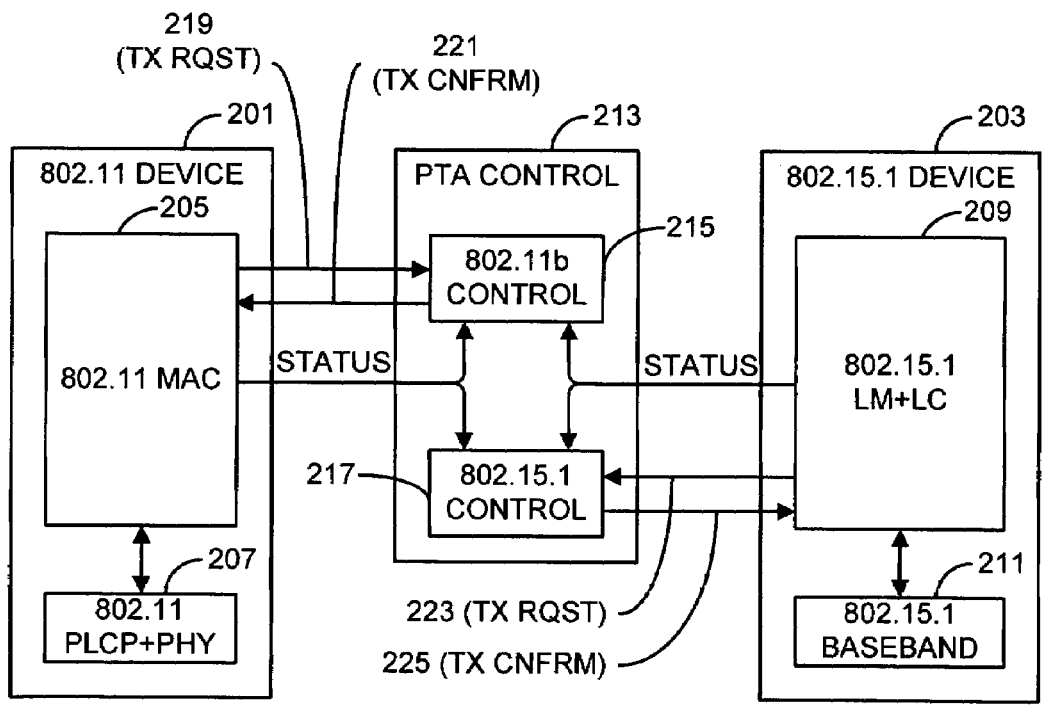
FIG. 2 is a block diagram of a conventional packet arbitration mechanism that operates at the MAC level in an attempt to allow two co-located radio transceivers to operate.
Figure 3:
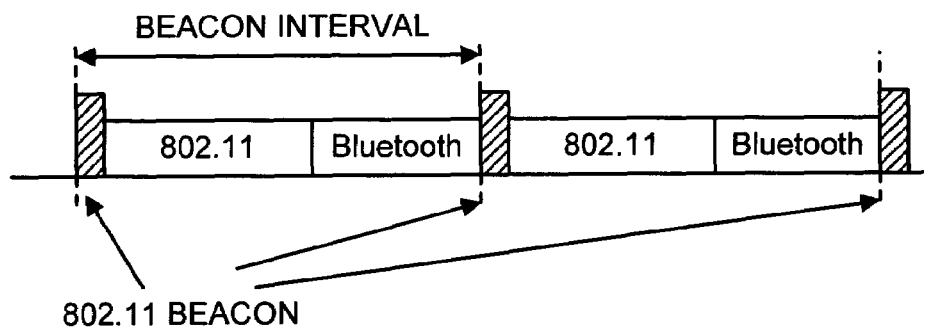
FIG. 3 is a timing diagram illustrating a conventional Alternating Wireless Medium Access (AWMA) technique.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In accordance with an aspect of the invention, a time-sharing mechanism is provided that enables two different radios (e.g., a Bluetooth® radio and a WLAN IEEE 802.11 radio) utilizing the same frequency band and co-located with one another to operate. Time-sharing is used because when only one radio operates at any given instant in time, perfect isolation is achieved. While in the following examples, the two different radios are described as being a Bluetooth® radio and a WLAN IEEE 802.11 radio, it will be recognized that the principles that permit these two radios to operate despite being co-located with one another are equally applicable to other types of radio units. Thus, it is not essential that the two radios be a Bluetooth® radio and a WLAN IEEE 802.11 radio, respectively.

In another aspect, the time-sharing algorithm is applied at the MAC level of the two radio systems. This is done because, at the MAC level, real-time conditions are known and the traffic conditions on the WLAN and Bluetooth® channel are known. The sharing algorithm performed in the MAC generates and utilizes, for each of the co-located radios, idle/busy information showing the instantaneous status of the radio, and also a Radio Idle Vector (RIV) preferably (although not necessarily) indicating the maximum amount of time that the radio can remain idle. From the point of view of the other radio, the RIV indicates when the radio must have access to its channel. This RIV can be derived from activity on the channel not involving the considered (co-located) radios, or it can be derived from information about the maximum amount of time that the radio can defer transmission (including that of priority traffic). This information allows the other radio to schedule its transactions within the provided window. Since the procedure is preferably based on the MAC protocol (e.g., the 802.11 MAC protocol), it is not dependent on the physical layer and can support, for example, 802.11, 802.11b, and 802.11g. Similarly, higher data rates in Bluetooth® wireless technology can be supported without requiring any changes to the specifications. These and other aspects will now be described in greater detail in connection with a number of exemplary embodiments.

As explained earlier, when two radios operating in the same frequency band are located within very close proximity of one another, a problem arises due to strong interfering signals transmitted by one radio being supplied to the receiver of the other radio. This is an extreme case of a problem which is more generally known as the "near-far problem." Even if the radios do not use exactly the same frequency channel, problems arise which cannot be overcome. This can generally be attributed to three effects: a non-zero transmitter noise floor at the transmitter, limited selectivity of the channel receive filters, and limited linearity of the receiver front-end circuitry which leads to desensitization.

Figure 4:
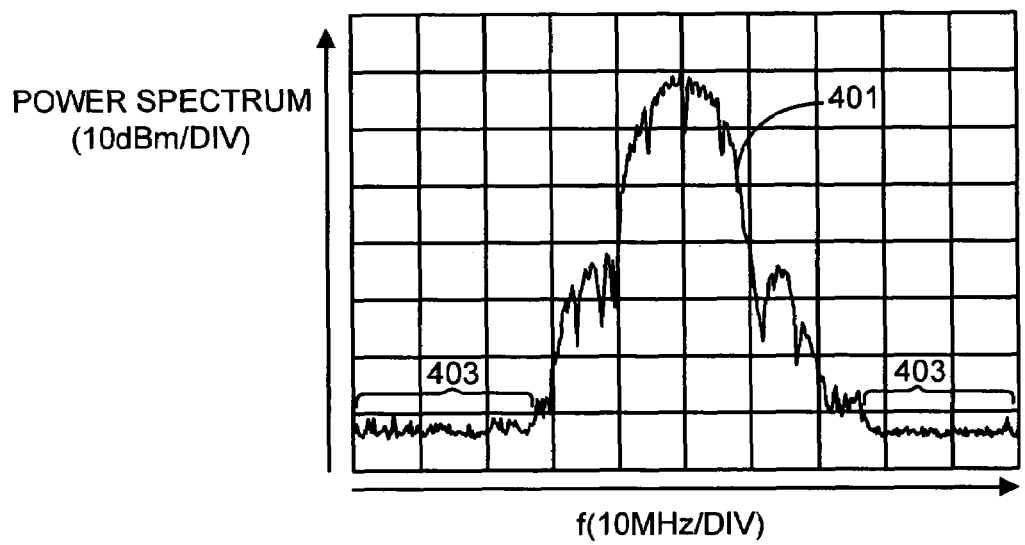
FIG. 4 is a graph of the transmit spectrum of a system such as WLAN 802.11b.

The first of these effects will now be discussed with reference to FIG. 4, which is a graph of the transmit spectrum of a system like WLAN 802.11b. It can be seen that, although the signal 401 is concentrated in a bandwidth of about 22 MHz around the carrier, there is a non-zero transmitter (TX) noise floor or TX skirt 403. In the WLAN standard, the noise floor should be better than 50 dBr (i.e., 50 dB relative to carrier). However, if the WLAN radio transmits at 20 dBm, the power in the noise floor is still considerable, like −40 dBm/MHz. If we assume a co-located Bluetooth® receiver operating at a carrier which is offset by, for instance, 40 MHz from the WLAN carrier and sharing a common antenna with the WLAN radio, then the noise level in the Bluetooth® receiver is raised to −40 dBm (Bluetooth® wireless technology has a 1 MHz channel filter). The Bluetooth® standards require a carrier-to-noise figure (C/N) on the order of 15-20 dB. Thus, the received Bluetooth® signal has to be on the order of −25 to −20 dBm in order to overcome the noise floor. This, of course, is unacceptable since, with a maximum output power of 20 dBm, the resultant range for the Bluetooth® link would be very small. It will be noted that the noise floor in the Bluetooth® receiver without interference is on the order of −100 dBm.

The above-described effect of the transmission skirt does not only affect the Bluetooth® receiver. Rather, in a manner similar to that described above, the Bluetooth® transmission will raise the noise floor in the WLAN receiver.

As mentioned above, another effect that contributes to the co-location problem is the limited selectivity of the channel receive filter. The receive filter will have a pass band optimized to let pass only the intended signal and to reject all signals outside this band. However, the selectivity of a filter will be limited by implementation effects. For example, leakage effects do not permit the stop band rejection to be more than about 50-60 dB. That is, a strong signal, even if not in the pass band, cannot be suppressed more than 60 dB. Consequently, a high power +20 dBm WLAN signal will show up as an interfering signal of −40 dBm, even if the WLAN carrier is far away from the Bluetooth® carrier.

The third of the above-mentioned effects that arises when a strong interfering signal enters the receiver is desensitization. More particularly, the strong interfering signal drives the receiver operation into a nonlinear area. This, in turn, reduces the gain of the input stage, which can also be translated into an increase of the noise floor. Taking the example of a 20 dBm WLAN transmission and a common antenna, the noise floor will rise to the same kind of level as is caused by the TX skirt.

The co-location problem can be solved in two ways: either by suppression or by avoidance. By "suppression" is meant the receiver's attempt to suppress or cancel the interference. However, because of the large power differences between the intended signal and the interference, suppression levels in excess of 40 dB are required. In practice this is difficult to realize.

The other option, "avoidance", involves the radios operating in a manner designed to avoid their interfering with one another. This can be achieved, for example, in the frequency domain; adaptive frequency hopping (AFH) is one example of a frequency-based avoidance technique. Unfortunately, the large power differences, the TX skirts, the stop band rejection, and the limited linearity prevent AFH from solving the co-location problem as shown above.

The only viable alternative is avoidance in time, whereby a radio either avoids receiving when the other radio is transmitting, or alternatively avoids transmitting when the other radio is receiving. This requires traffic scheduling because the traffic flow must be controlled to allow for this timing division.

Figure 5:
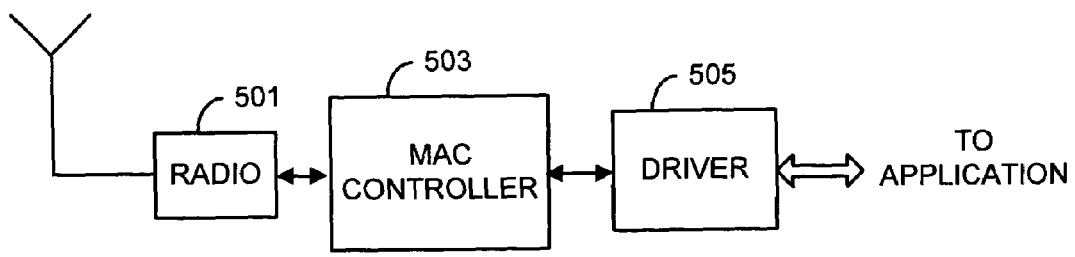
FIG. 5 is a block diagram depicting, at a high level, components of a transceiver.

Referring now to the block diagram depicted in FIG. 5, it can be seen that a transceiver can be divided into three high-level components: a radio 501, a MAC controller 503, and a driver 505. The radio 501 maintains the physical link, the MAC controller 503 takes care of channel access and link control, and the driver 505 provides an interface between the transceiver and the application. Traffic scheduling can take place either at the driver level or at the MAC level. The driver level is an attractive option because it can completely be implemented in software. However, there are two disadvantages to implementing traffic scheduling at the driver level:

1. the driver level has no real-time information; and
2. the driver level has no notion of channel occupancy.

The first disadvantage makes it difficult to design a sharing algorithm that can handle time critical services such as voice communication. If both radios could be limited to supporting only best effort services, then scheduling at the driver level would be an option. But even with such a limitation, a lot of bandwidth would be wasted, because the driver level has no notion of the situation on the channel. This is particularly important for WLAN where the channel is shared among many users. When other users occupy the channel, the WLAN radio cannot transmit anyway, so the Bluetooth® radio should be given the opportunity to operate. But without knowledge of how the WLAN channel is being used, a driver-level solution would be unable to optimize its scheduling decisions.

Scheduling at the MAC level does not have these disadvantages. To the contrary, a MAC-level scheduler is capable of implementing interference avoidance while guaranteeing that the channel usage requirements for synchronous or priority traffic, such as voice communication, will be met. And, since the channel occupancy status is known at this level (both for WLAN and Bluetooth® wireless technology), a more efficient use of the shared resource can be obtained, resulting in minimum throughput degradation on the Bluetooth® and WLAN connections.

Several time-sharing algorithms have been presented in the past. An overview is given in the above-mentioned presentation entitled Tim Godfrey, "802.11 and Bluetooth Coexistence Techniques", presented to Bluetooth Developers Conference Dec. 11, 2002. However, the described methods require changes in the standards, require that the co-located Bluetooth® radio be a master, or require that real-time traffic not be considered in the scheduling.

Figure 6:
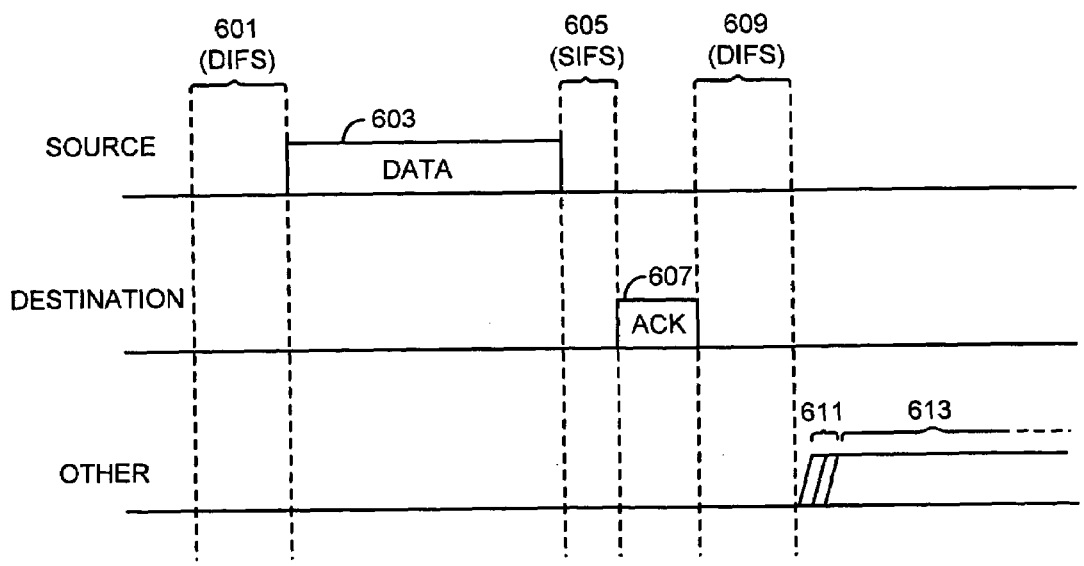
FIG. 6 is a timing chart of a basic MAC mechanism as described by the IEEE 802.11 WLAN standard.

The difficulty with arriving at an attractive sharing algorithm for WLAN IEEE 802.11 and Bluetooth® wireless technology lies in the completely different MAC approaches used in the two systems. WLAN 802.11 uses a distributed control where units can try to access the channel at any moment in time. Collisions are minimized by a listen-before-talk mechanism (Carrier Sense Multiple Access/Collision Avoidance, or "CSMA/CA") with back off and a possible handshaking prior to the transaction. The duration of the transaction is highly variable since it depends on the payload size and the modulation rate used. FIG. 6 shows a timing chart of a basic MAC mechanism as described by the WLAN standard (IEEE Std. 802.11-1997, "Part 11: WLAN MAC and PHY specifications," 1997). Before a unit may transmit, the channel must have been free for at least a predefined period of time denoted Distributed InterFrame Spacing (DIFS) 601. After a packet of variable size has been transmitted (e.g., transmission of data 603 by the "source" indicated in FIG. 6), the destination waits a second predefined period of time, denoted Short InterFrame Spacing (SIFS) 605, where SIFS<DIFS, and returns an acknowledge (ACK) packet 607. The data and associated ACK form one transaction. Other units listen and remain quiet as long as the channel is occupied. When any of these other units wants to transmit, it initializes a random back-off counter. Following the conclusion of the next DIEFS 609, each of the other units decrements its back-off counter (611) for every time slot that the channel is sensed free. When the counter reaches zero in a given unit, that unit begins transmitting (613). Because each back-off counter is initialized to a random value, it is highly unlikely that two or more of the "other units" will have counters that reach zero at the same time, thereby usually avoiding a collision. If a collision does occur, then both transmissions fail and the units start to contend for the channel again according to the scheme described above.

The actual lengths of these various timing intervals are standardized. In the IEEE 802.11b standard, SIFS=10 µs, DIFS=50 µs, and each timeslot (i.e., the rate at which the back-off counter is decremented) is 20 µs long. For comparison, in the IEEE 802.11g standard, SIFS=16 µs, DIFS=34 µs, and each timeslot is 9 µs long.

A Network Allocation Vector (NAV) is included in the header of each packet. The NAV shows for how long the channel will be occupied (this duration includes data plus ACK). Optionally, a Request to Send/Clear to Send (RTS/CTS) handshaking is applied to combat hidden node problems. More particularly, prior to transmitting the data, the source sends a (short) RTS packet to the intended recipient. The intended recipient then replies by transmitting a (short) CTS packet. If RTS/CTS is applied, then this transaction time is also taken into account in the NAV. All packets are spaced by SIFS. Depending on the amount of data being transmitted (the Mac Protocol Data Unit, or MPDU, size ranges from 1 to 1534 bytes) and the type of modulation being used (1, 2, 5.5 and 11 Mb/s are available under IEEE 802.11b; 6, 9, 12, 18, 24, 36, 46, 54 Mb/s are available under IEEE 802.11g), the duration of the transaction can range from some 100 µs to more than 10 ms. The DIFS and SIFS are on the order of a few tens of microseconds. Short packets are on the order of 100-200 µs. Longer packets, in particular at lower data rates, can last several milliseconds. Apart from the busy periods indicated by the NAV, source and destination have to listen to the channel continuously in order to find out when the channel is free or to detect that the unit is being addressed, respectively. If a Point Coordination Function (PCF) is defined, an access point (AP) (e.g., a base station) is present which broadcasts beacons. In that case, a terminal (called "station" or STA) can enter a low power state in which it only wakes up at certain beacon instances.

Figure 7:
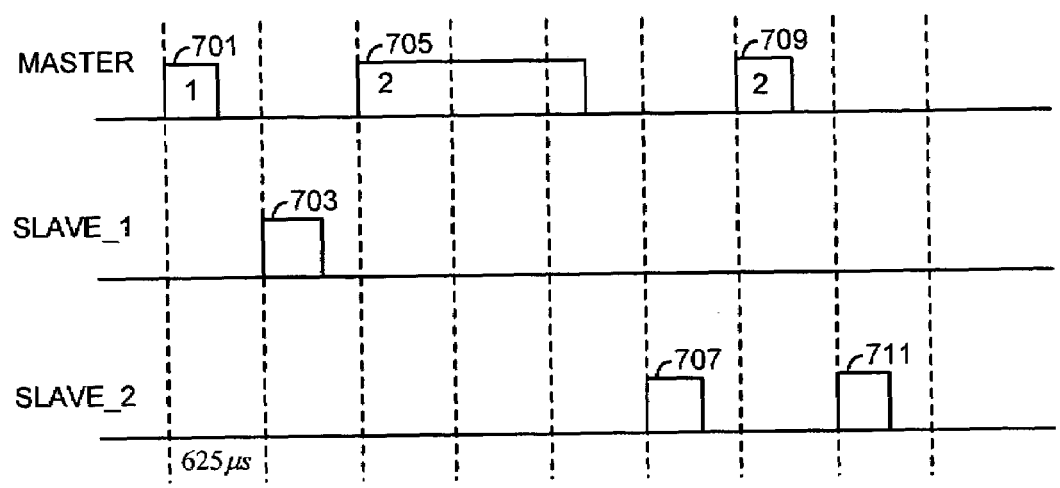
FIG. 7 is a timing diagram illustrating the basic MAC mechanism employed in Bluetooth® wireless technology.

By contrast, Bluetooth® wireless technology deploys a centralized control in which a master unit strictly controls the channel access. FIG. 7 is a timing diagram of the basic MAC mechanism employed in Bluetooth® wireless technology. All transmissions start at slot boundaries spaced apart at 625 µs intervals, and access duration is in discrete lengths according to the number of time slots used for the transmission (e.g., single-slot or multi-slot packets). In accordance with the MAC mechanism, a master unit determines which of a number of slave units to send a packet to (or just a header, if there is no data to be transmitted to the slave unit). Receipt of a packet (or a header) by a slave unit informs that slave unit that it is free to transmit in the next available slot; no other slave units may transmit at that time. In the example illustrated in FIG. 7, a master unit transmits at least a header to slave number 1 (701). In the next available time slot, slave number 1 transmits something back to the master unit (703). This may, for example, be an acknowledgment (ACK) with or without associated data. At 705, the master unit occupies three time slots to transmit data to slave number 2. In the next available time slot, slave number 2 transmits something back to the master unit (707). The master unit next uses one timeslot to transmit something else to slave unit number 2 (709). Once again, in the next available time slot slave unit number 2 transmits something back to the master unit (711).

In Bluetooth® wireless technology, synchronous traffic such as voice communication is supported by a Synchronous Connection Oriented (SCO) link which consists of a reserved time slot pair spaced at regular intervals. Asynchronous traffic is supported by Asynchronous ConnectionLess (ACL) links. Acknowledgement information is piggybacked in the header of the packets in the opposite direction.

Strictly speaking, the co-location problem occurs only when one radio transmits and the other listens. Consequently, the optimal sharing algorithm would allow simultaneous transmission and simultaneous reception by the two radios. However, due to the difference in dynamics and time scales in their respective MACs, in practice this becomes too complex. In 802.11 technology as well as in Bluetooth® wireless technology, transmission and reception are highly correlated through the ACK mechanism and through duplex services such as voice communication. Aligning the transmit times and receive times of Bluetooth® wireless technology with those of WLAN 802.11 technology is an impossible task because these two technologies have completely different time scales.

Accordingly, the sharing algorithm presented here does not differentiate between transmission and reception, but instead considers transactions regardless of type, and permits only one radio at a time to be in operation (transmission or reception) at any given moment. Even with this compromise, however, providing a sharing mechanism for MAC procedures that differ from one another to such an extreme is not an easy task. Both the dynamics and the time scales differ widely. In accordance with an aspect of the sharing mechanism described herein, one MAC controller opens a window of no activity (idle) in which the other MAC controller may operate.

The presented sharing algorithm makes use of two features present in both Bluetooth® wireless technology and WLAN 802.11, namely known channel occupancy and deferral of transaction.

As to known channel occupancy, both air interfaces include information that indicates how long the radio will be idle. In WLAN 802.11, this information is conveyed through the NAV, which indicates how long the WLAN channel will be in use by a third party (i.e., the co-located radio is not involved). With respect to Bluetooth® wireless technology, the packet type lets a Bluetooth® unit know how long the Bluetooth channel will be in use by a third party (i.e. the co-located radio is not involved), or how long an idle interval there will be between scheduled transmission and reception.

As to deferral of transaction, both MAC protocols can open up windows of idle time in order to give room for the other radio system to operate. With respect to WLAN 802.11, a unit acting as a source can defer the transmission of an MPDU to a later point in time; as a destination, a unit can defer listening to the channel. This latter action may give rise to retransmissions by the source, but this is not something that is normally fatal to communication. As to the Bluetooth® wireless device, the master can defer the transmission of packet to a later time slot, and the slave can defer listening to the channel. This latter action may give rise to retransmissions by the master, but again this is not something that is normally fatal to communication. The deferral mechanism can even be applied to Bluetooth® synchronous links when extended SCO (eSCO) is available.

Figure 8:
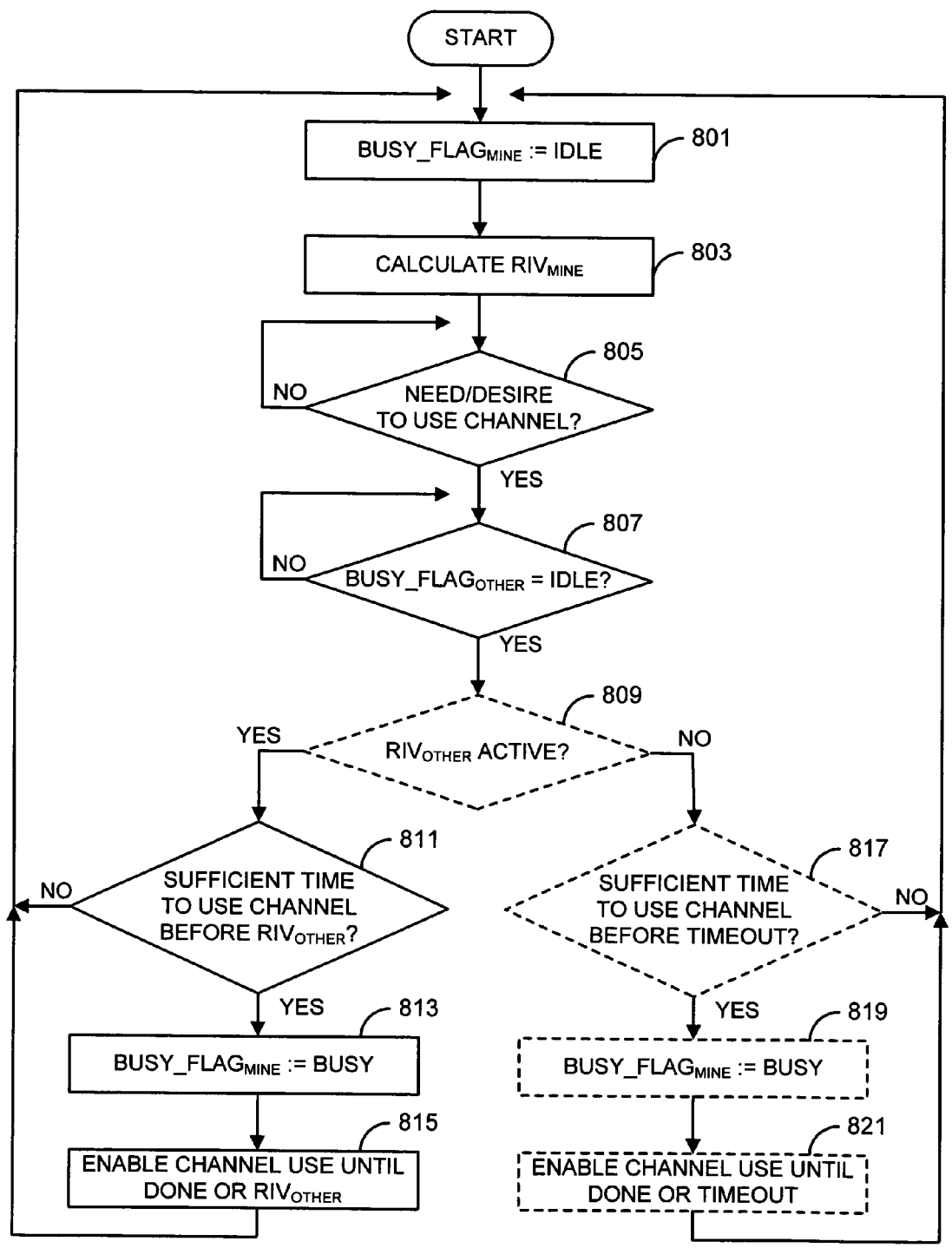
FIG. 8 is a flow diagram of logic that is applied in several exemplary embodiments.

FIG. 8 is a flow diagram of logic that is applied in several exemplary embodiments. As mentioned earlier, this logic should be performed at the MAC layer in each of the co-located radio units. Several parameters are used in these embodiments. One is a BUSY flag, which is generated by a radio unit to indicate whether it is presently idle or busy (i.e., using its radio channel). Another is a Radio Idle Vector (RIV), which is a multivalue signal generated by a radio unit to indicate a future point in time when it will again require access to the channel. In preferred embodiments, this is based on a maximum amount of time that the radio unit is able to remain idle. The RIV parameter may take on a number of forms. In some embodiments the RIV is expressed as a (future) point in time. These embodiments require that a common reference clock be shared by the two MAC controllers. Alternatively, the RIV can be expressed as an initialized counter value that is decremented at a fixed rate (e.g., at 1 or 0.1 MHz). In the latter case, the value is used as an offset, indicating how much time remains until a radio unit requires access to its channel. To facilitate the following discussion, it will be assumed that the RIV indicates a particular point in time rather than an offset. Those skilled in the art will readily ascertain how to implement embodiments in which the RIV is instead expressed as a counter value (i.e., offset plus own clock value equals future clock value).

Since the same high-level logic may be performed in each of the co-located radios, and the generated parameters are exchanged between the co-located radios, the following terminology will be used to avoid confusion: the subscript "mine" is applied to parameters generated by the radio unit performing the logic, and the subscript "other" is applied to parameters received from the other one of the co-located radios.

A radio unit begins the logic by initializing its $BUSY_{mine}$ flag to a value indicating that it is IDLE (e.g., $BUSY_{mine}=0$) (step 801). The radio unit also determines at what future point in time it will require access to its channel. In preferred embodiments, this is based on the maximum amount of time that it is permitted, under the relevant standard (e.g., WLAN 802.11 or the Bluetooth® standard), to remain idle. The radio unit then initializes its $RIV_{mine}$ to this value (step 803).

Next, the radio unit determines whether it needs or desires to use its channel (decision block 805). If not ("NO" path out of decision block 805), the logic simply loops back to decision block 805 to repeat this test. If there is a need or desire to use the channel ("YES" path out of decision block 805), then the radio unit needs to determine whether the other radio unit is presently busy with a transaction. This is accomplished by testing whether the other radio unit's $BUSY_{other}$ flag is set to IDLE (decision block 807). If the other radio unit is not idle ("NO" path out of decision block 807), then this radio unit must wait for the other radio unit to stop being busy. This may be accomplished by repeating the test at decision block 807.

After this radio unit determines that the other radio unit is idle ("YES" path out of decision block 807), it could conceivably just set its own BUSY and RIV parameters and then begin using its channel. However, in preferred embodiments this radio unit first determines whether there is sufficient time for it to complete its intended transaction before it needs to (or in some embodiments, out of fairness ought to) relinquish its use of the channel. Thus, some embodiments include this radio unit testing whether there is sufficient time to use the channel before the other radio unit will need it again as indicated by the $RIV_{other}$ parameter (decision block 811). If there is not sufficient time ("NO" path out of decision block 811), then this radio unit does not perform its transaction, but instead returns to block 801, where it will again ensure that it's $BUSY_{mine}$ flag is in an IDLE state and determine an appropriate $RIV_{mine}$ value. However, if there is sufficient time to perform the intended transaction ("YES" path out of decision block 811), then this radio unit sets its $BUSY_{mine}$ flag to indicate a "busy" status (e.g., $BUSY_{mine}=1$) (step 813) and enables channel usage until a desired transaction is complete or alternatively until the other radio unit requires access to its channel (as indicated by the $RIV_{other}$ parameter) (step 815). Logic flow then returns to step 801. It should be noted that the phrase "enables channel usage" does not necessarily mean that this radio unit will actually use its channel, although this is of course a possibility. However, it may, for example, simply monitor its channel to see if it is the intended recipient of a third party's transmission. Thus, the phrase "enables channel usage" merely means that this radio unit is free to operate in accordance with all aspects of its relevant MAC standard without being concerned about concurrent channel usage by the co-located radio (i.e., the "other" radio unit).

Still other embodiments take into account the fact that a radio unit may be permitted to remain idle indefinitely, for example when it is engaged in best effort traffic. Under such circumstances, that radio unit may set its RIV equal to a very distant future point or even infinity. This would permit the other radio unit to monopolize the channel, since testing whether there is sufficient time to use the channel before $RIV_{other}$ (e.g., the test at decision block 811) would always yield an affirmative result. In order to avoid the idle radio unit from suffering channel starvation, some embodiments incorporate logic that has the busy radio unit relinquishing use of the channel not based on the $RIV_{other}$ parameter, but rather on some other parameter such as an "own" timeout parameter.

As an illustration of this feature, FIG. 8 further includes blocks 809, 817, 819, and 821. To emphasize the optional nature of these steps, these blocks are depicted in dotted lines. (As mentioned earlier, decision block 811 is also an optional feature; however, it is depicted with solid lines to distinguish it from the feature now being described.) Turning now to decision block 809, this block is entered when this radio unit has determined that the other radio unit is no longer using the channel. The purpose of decision block 809 is for this radio unit to determine whether it should rely on the other unit's RIV parameter, or whether it should instead initialize an internal counter to some timeout value and then relinquish access to the channel when a timeout event occurs. Thus, if the other radio unit's RIV parameter is to be considered "active" (i.e., this radio unit should base decisions on the other radio unit's RIV parameter) ("YES" path out of decision block 809), then the logic proceeds to decision block 811, which was described earlier.

However, if the other radio unit's RIV parameter is not to be considered "active" (i.e., this radio unit should not base decisions on the other radio unit's RIV parameter) ("NO" path out of decision block 809), then the logic proceeds to decision block 817. Decision block 817 determines whether there is sufficient time to use the channel before this radio unit's timeout event occurs. If there is not sufficient time ("NO" path out of decision block 817), then this radio unit does not perform its transaction, but instead returns to block 801, where it will again ensure that its BUSY flag is in an IDLE state and determine an appropriate RIV value. However, if there is sufficient time to perform the intended transaction ("YES" path out of decision block 817), then this radio unit sets its $BUSY_{mine}$ flag to indicate a "busy" status (step 819) and enables channel usage until a desired transaction is complete or alternatively until this radio unit's timeout event occurs (step 821). Logic flow then returns to step 801.

Determining whether one radio unit's RIV parameter should be considered "active" by the other radio unit can be accomplished in any of a number of ways, none of which are essential to the invention. For example, some embodiments might employ setting RIV to a predetermined value (e.g., to a maximum value) as a way of signaling to the other radio unit that this radio unit can, in principle, remain idle indefinitely. Embodiments in which the RIV represents a count or offset value are better suited for this type of signaling between co-located radio units than embodiments in which the RIV represents an absolute point in time because in the latter case, it is cumbersome to reserve one clock value to represent the RIV inactive state.

Alternatively, extra signals can be exchanged between the two co-located radio units to expressly indicate whether one radio unit should base decisions on the other radio unit's RIV parameter. These extra signals can be considered separate and apart from the several parameters described above, or alternatively could be considered to be included in the BUSY flag, where the BUSY flag is modified to take on any of at least three values (e.g., "busy","idle—RIV active", and "idle—RIV inactive").

Figure 9:
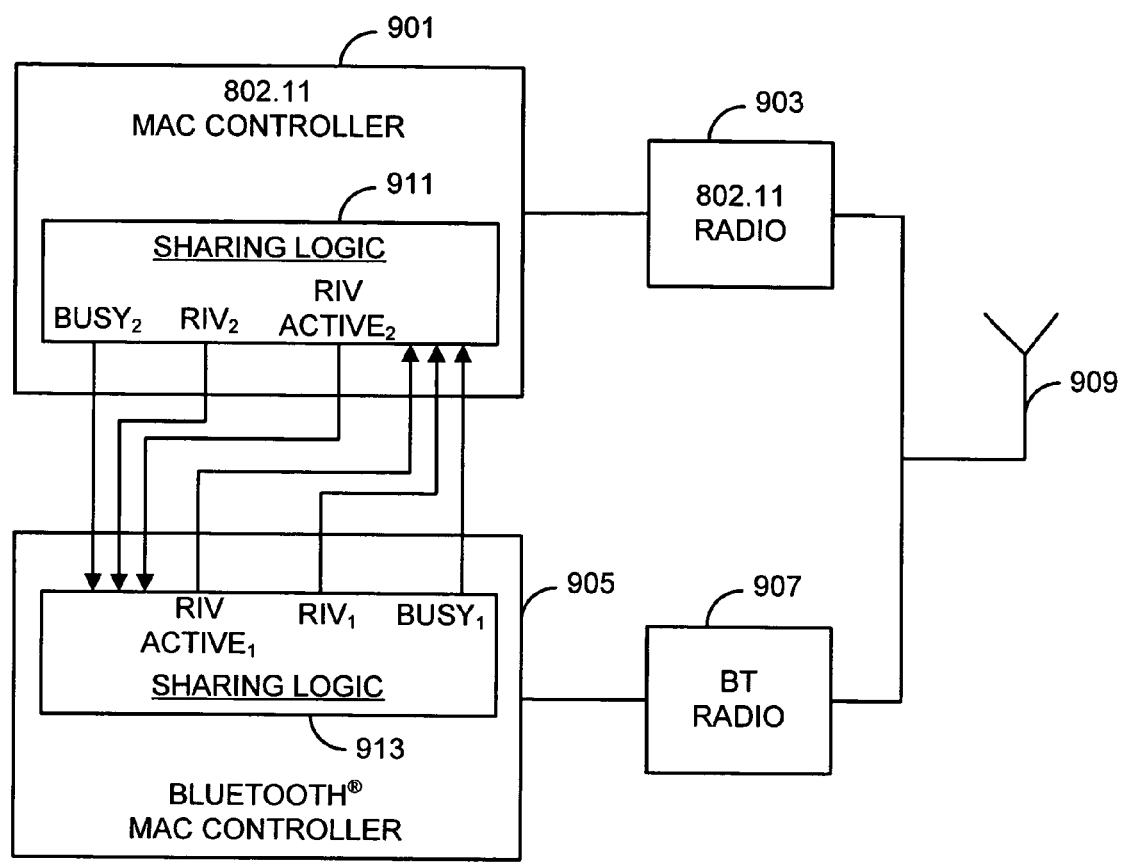
FIG. 9 is a block diagram of an exemplary embodiment in which a WLAN 802.11 radio and a Bluetooth® radio are co-located.

To further illustrate various aspects, FIG. 9 is a block diagram of an exemplary embodiment in which a WLAN 802.11 radio and a Bluetooth® radio are co-located. More particularly, FIG. 9 shows a WLAN 802.11 MAC controller 901 controlling an 802.11 radio 903, and a Bluetooth® MAC controller 905 controlling a Bluetooth® radio 907. The 802.11 radio 903 and the Bluetooth® radio 907 share a common antenna 909. The WLAN 802.11 MAC controller 901 includes sharing logic 911 that implements a sharing mechanism such as that depicted in FIG. 8, while the Bluetooth® MAC controller 905 similarly includes sharing logic 913, also for implementing the sharing mechanism.

The sharing mechanism, such as the logic depicted in FIG. 8, requires an interaction between the MAC controllers of the two radios. Thus, the interface has a number of signals. One of these is a one-bit signal $BUSY_1$ supplied by the Bluetooth® MAC controller 905 to the WLAN 802.11 MAC controller 901 for indicating whether the Bluetooth® radio is idle (e.g., $BUSY_1$=0) or is busy (e.g., $BUSY_1$=1). When idle, the radio sleeps; when busy, it is transmitting or receiving/monitoring. A multi-value signal $RIV_1$ is supplied by the Bluetooth® MAC controller 905 to the WLAN 802.11 MAC controller 901 to indicate the Radio Idle Vector. This value is valid unless $BUSY_1$=1 (radio busy) or a third signal, $RIV\_ACTIVE_1$ is not asserted (e.g., $RIV\_ACTIVE_1$=0). When valid, $RIV_1$ indicates when the Bluetooth® radio will require access to its channel (e.g., the maximum amount of the time that the Bluetooth® radio may remain in idle mode). This should not be construed as a guarantee that the Bluetooth® radio will remain idle throughout this period, as is evident from the flow diagram of FIG. 8 as well as in examples set forth below. In this exemplary embodiment the RIV expressly indicates a (future) point in time; thus, there is a common reference clock shared by the two MAC controllers (not shown). As stated earlier, however, in alternative embodiments the RIV may be expressed as an initialized counter value which is decremented at a fixed rate.

Continuing with the description of the interface, a $BUSY_2$ signal, an $RIV_2$ signal and an $RIV\_ACTIVE_2$ signal are supplied by the WLAN 802.11 MAC controller 901 to the Bluetooth® controller 905 with the same functions as just described, but now related to the status of the WLAN 802.11 radio. It is permissible for the two BUSY signals to both indicate "idle mode"; however, it is preferred that they never both indicate "busy mode", as this would indicate their concurrent use of the channel, which is preferably not permitted. The $BUSY_1$ value can be set to "idle" as long as a transaction is going on between other Bluetooth® radios (external master and other slave), or as long as no transactions are expected (e.g., SNIFF sleep interval or SCO sleep interval as defined in the Bluetooth® specifications). The $BUSY_2$ value can be set to idle as long as a transaction to a third party is going on (indicated in the NAV) or a sleep mode is entered in the power save mode, as defined in the 802.11 specifications.

The RIV value for either of the radios can be updated dynamically. The $RIV_1$ value (i.e., the future point in time when the Bluetooth® radio will require access to its channel) can depend on: the maximum duration of a current transaction, the SNIFF sleep interval, and the SCO sleep interval (and the retransmission delay in the case of an eSCO transaction). The $RIV_2$ value (i.e., the future point in time when the WLAN 802.11 radio will require access to its channel) can depend on: the current NAV (transaction time of a third party), and the sleep interval during the power save mode. In practice, it is preferred that the RIV value only be used for time critical events, like eSCO and SNIFF in Bluetooth® wireless technology. Likewise in WLAN devices, the RIV may indicate the arrival of the beacon for supporting low power modes, or the arrival of the beacon for supporting Quality of Service according to an upcoming specification IEEE 802.11e, which is described in S. Mangold et al, "Analysis of IEEE 802.11e for QoS support in Wireless LANs, *IEEE Wireless Communications*, pp. 40-50, December 2003. The RIV value can, at any time, be changed to indicate a later moment in time. In some applications, there may also be a need to impose a guard time between the time indicated by the RIV and the actual time when the radio starts operating.

Based on the status of the incoming BUSY, RIV and RIV_ACTIVE signals, the MAC controller can schedule its transactions up to the time indicated in the RIV. When the RIV is not active (e.g., when there is only best-effort traffic), then the scheduling can be based solely on the status of the incoming BUSY signal. When the incoming BUSY signal indicates a busy condition, it is preferred that the MAC controller remain in idle mode until the incoming BUSY signal returns to idle mode again. When there is no data exchange on the WLAN channel, all WLAN receivers are receiving to check for incoming data. Thus, the IEEE 802.11 standards would permit a WLAN receiver to be busy all the time. One way of preventing the WLAN controller from being continuously busy checking incoming data is to arrange the system such that the Bluetooth® $RIV_1$ is always active even in the case of best-effort traffic on the Bluetooth® channel. This would prevent starvation of the Bluetooth® traffic flow. The $RIV_1$ parameter can be changed dynamically depending on the traffic on the Bluetooth® link. Alternatively, time-out mechanisms such as those depicted in FIG. 8 can be used to prevent starvation. The interface illustrated in FIG. 9 supports such optional timeout mechanisms.

Preferably, the Bluetooth® radio has the freedom to defer transmission even for priority services such as voice communication. This can be achieved by applying isochronous connections rather than synchronous connections. In an isochronous connection, a packet has to be delivered within a certain window, but its precise timing is not important. An isochronous connection is more robust than a synchronous connection because the time window allocated for the transmission is large enough to allow several retransmissions and can therefore better cope with packet losses. The extended SCO link (eSCO) as defined in the next Bluetooth® core release specification (Specification version 1.2) turns a synchronous (SCO) link into an isochronous link. Each voice packet carries some Cyclic Redundancy Check (CRC) bits in order to check the contents for errors. If there are errors, the recipient can request one or more retransmissions, as needed, until the "lifetime" of that particular packet has expired and the next packet has to be transmitted ("flushing" in Bluetooth® nomenclature).

Figure 10:
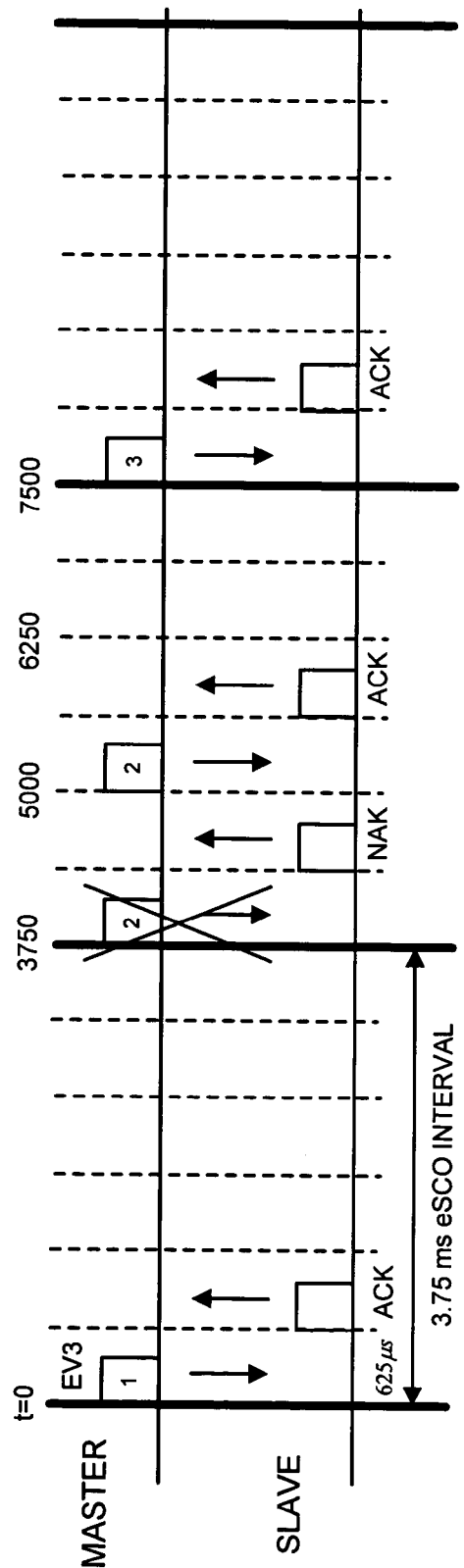
FIG. 10 is a timing diagram that illustrates an isochronous eSCO link using a type of packet denoted "EV3" in the Bluetooth® specifications.

FIG. 10 is a timing diagram that illustrates an isochronous eSCO link using a type of packet denoted "EV3" in the Bluetooth® specifications. Each packet carries 30 Bytes of voice which covers 3.75 ms of speech. Consequently, to ensure that smooth speech is reproduced at the destination, a new packet must be sent every 3.75 ms. However, transmission of an EV3 packet and its corresponding acknowledgment (ACK) require only 2×625 μs=1250 μs. Consequently, the 3.75 ms time interval provides three separate occasions in which this packet can be transmitted. For example, looking at FIG. 10, a master unit transmits an EV3 packet to a slave unit at t=0. In this example, the packet is successfully received so the slave unit sends an ACK back to the master unit at t=625 μs. The master unit sends the next EV3 packet at the start of the next 3.75 ms interval (i.e., at t=3750 μs, as depicted in FIG. 10). If this packet is lost, it is transmitted again as shown at t=5000 μs. In the example depicted in FIG. 10, this packet is successfully received by the slave unit, as indicated by the ACK returned by the slave unit at t=4375 μs. However, had the packet also been lost during this second attempted transmission, a retransmission could again be carried out at t=6250 μs. If an attempted transmission fails for a third time, then it must be indicated that the packet is lost because its lifetime has expired (3.75 ms maximum).

In the sharing mechanism described herein, this eSCO scheme (or its equivalent as defined by other standards that may be applicable to other embodiments) is used to intentionally defer packet transmission since it provides three occasions when a packet may be sent. The Bluetooth® unit can maximize the size of its idle window by indicating in its RIV the time point of the last possible opportunity for transmission. For example, after a successful transmission at t=0, the absolute latest time that the next transmission has to take place is at t=6250 μs. The Bluetooth® unit therefore maximizes the window of time that the co-located radio unit may access the channel by setting its $RIV_1$ parameter equal to 6250. As mentioned earlier, however, setting $RIV_1$ equal to a given point in time does not represent a commitment to remain idle until that time. Thus for example, if the co-located radio unit (e.g., the WLAN 802.11 radio unit) happens to be idle at t=3750 and/or at t=5000, then the Bluetooth® radio may take advantage of those times as well in order to increase robustness and to enlarge the next idle window.

A consequence of using the eSCO timing characteristics for transmission deferral instead of retransmission is a reduction in the robustness of the eSCO link. However, this is not a flaw in the present strategy, but rather a consequence of the loss in bandwidth caused by having to share the radio spectrum with the WLAN radio. The advantages of avoiding the WLAN transmissions outweigh the benefits of maintaining the maximum retransmission capability specified by the standards.

Figure 11:
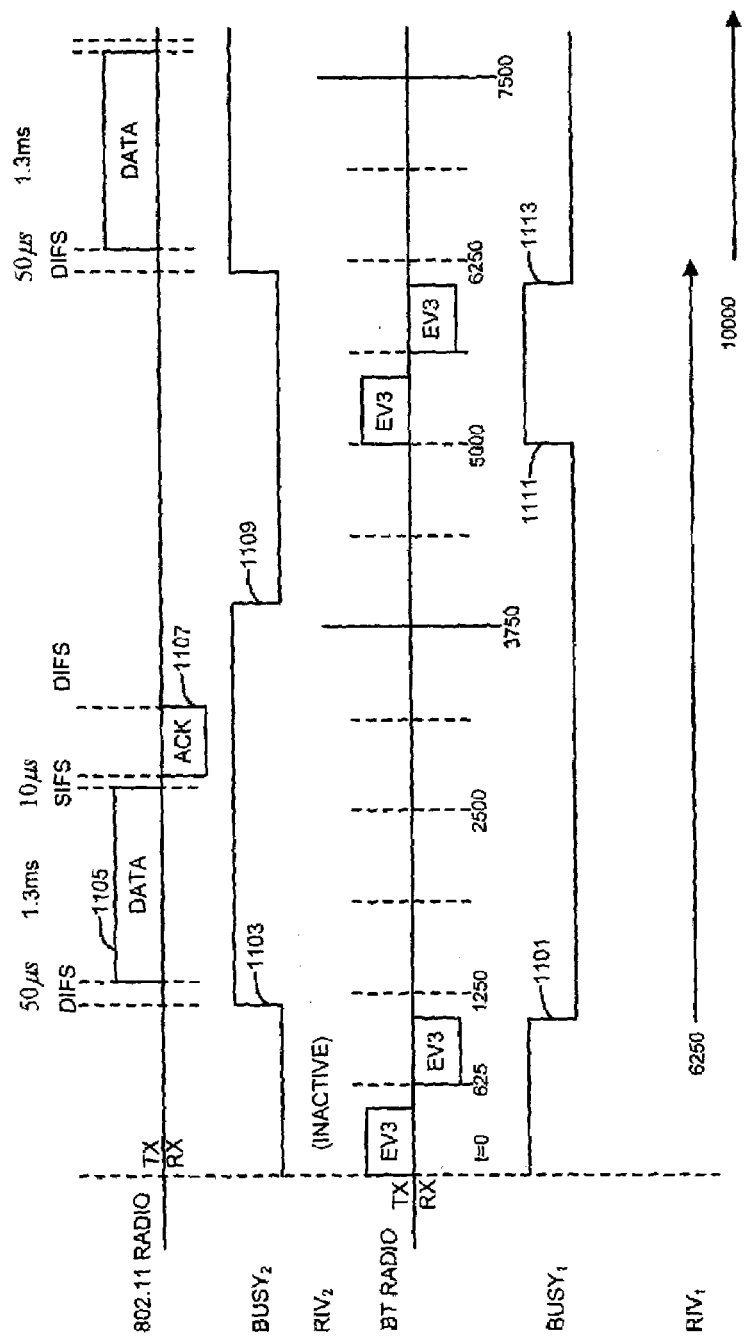
FIG. 11 is a timing diagram depicting exemplary behavior of a WLAN 802.11b radio operating at 11 Mb/s supporting a best-effort service, and a co-located Bluetooth® radio unit that has established a voice link that uses the eSCO mechanism with EV3 packets at a nominal interval of 6 time slots (or 3.75 ms).

To further illustrate various aspects of the sharing mechanism described herein, some examples will now be presented. In a first example, consider a WLAN 802.11b radio operating at 11 Mb/s supporting a best-effort service, and a co-located Bluetooth® radio unit that has established a voice link that uses the eSCO mechanism with EV3 packets at a nominal interval of 6 time slots (or 3.75 ms). An exemplary timing diagram of the situation is illustrated in FIG. 11. In this case, the WLAN radio's best-effort traffic is outgoing and the Bluetooth® radio is acting as a master. At t=0, an EV3 pair is exchanged on the Bluetooth® link. $BUSY_1$ is high, indicating the Bluetooth®'s busy status. The WLAN radio is idle, as indicated by $BUSY_2$ being non-asserted. When the last EV3 packet has been received, $BUSY_1$ goes low (signal transition 1101) to indicate an idle condition and the Bluetooth® unit's new value for $RIV_1$ is determined. The last occasion for the next EV3 pair to be transmitted is at t=6250. Note that this window of approximately 5000 μs is the maximum window that the Bluetooth® link can open for the WLAN radio. Since in this example it is assumed that data is queued in the WLAN radio, $BUSY_2$ goes high (signal transition 1103) as soon as $BUSY_1$ goes low. This example assumes that, after a DIFS period, the WLAN radio gets access to the channel and starts sending a 1500B packet (transmission 1105). The transmission is acknowledged (transmission 1107), and since there is ample time left ($RIV_1$ is set to indicate t=6250) and there is still data in the queue, the WLAN radio continues with reception applying carrier sensing before the next transmission.

At t=3750, the Bluetooth® unit's first opportunity to exchange the next EV3 pair arrives. However, the Bluetooth® unit detects that $BUSY_2$ is still asserted at this time, so the Bluetooth® radio defers from transmission. In this timing example it is assumed that the WLAN radio senses the channel to be busy (or loses during the contention resolution period) and consequently refrains from sending. Before going idle however, the WLAN radio should read the header of the next packet transmission on the WLAN channel to check whether it is being addressed. If not, the WLAN radio sets $BUSY_2$ to a non-asserted state (signal transition 1109). In this example, this occurs around t=4000.

At t=5000, there is a next opportunity for the Bluetooth® radio to send an EV3 pair. Since $BUSY_2$ is non-asserted, the Bluetooth radio becomes active and sets its $BUSY_1$ flag to an asserted state (signal transition 1111). Upon going active, the Bluetooth® unit exchanges the voice packets. The slave connected to the Bluetooth link (not a co-located radio) is not detrimentally affected by the timing of this event because it merely assumes that the transmission normally scheduled at t=3750 failed and that a retransmission was initiated. Since the Bluetooth® unit has time to wait until its next required transmission time, it updates its $RIV_1$ value to indicate t=10000, which is the latest time that its next EV3 transmission must start. Note that the time window that the Bluetooth® provides now is smaller than the previous window; this is a result of the second transmission being deferred. The Bluetooth® unit then sets $BUSY_1$ to a non-asserted state (signal transition 1113). When this is detected by the WLAN radio, the WLAN radio becomes active again, and a successful access is assumed at t=6250. Note that instead of becoming active at t=5000, the Bluetooth® unit could have waited until t=6250. However, because the WLAN radio was idle at t=5000, the Bluetooth® radio took the opportunity to become active in order to have a larger idle window available next time where it can be of use to the WLAN radio.

It should be noted that, had the WLAN radio gotten access to the channel again at t=4000, it would have had to adapt the size of the data packet such that the data transmission and the returning ACK packet would fit in the window indicated by the $RIV_1$ (i.e., it was necessary for the WLAN's transaction to be finished before t=6250). In that case, the Bluetooth® radio would have had to defer transmitting at t=5000 and instead wait until t=6250.

Note that if the Bluetooth® radio had been the slave instead of the master in this example, a similar procedure would have been carried out. The master, not knowing about the sharing algorithm in the slave, would have sent an EV3 packet at t=3750. However, because the slave was not listening, no ACK would have been received and the master would have assumed a packet loss. It would therefore have retransmitted at t=5000, and the same situation as illustrated in FIG. 10 would have been obtained.

Figure 12:
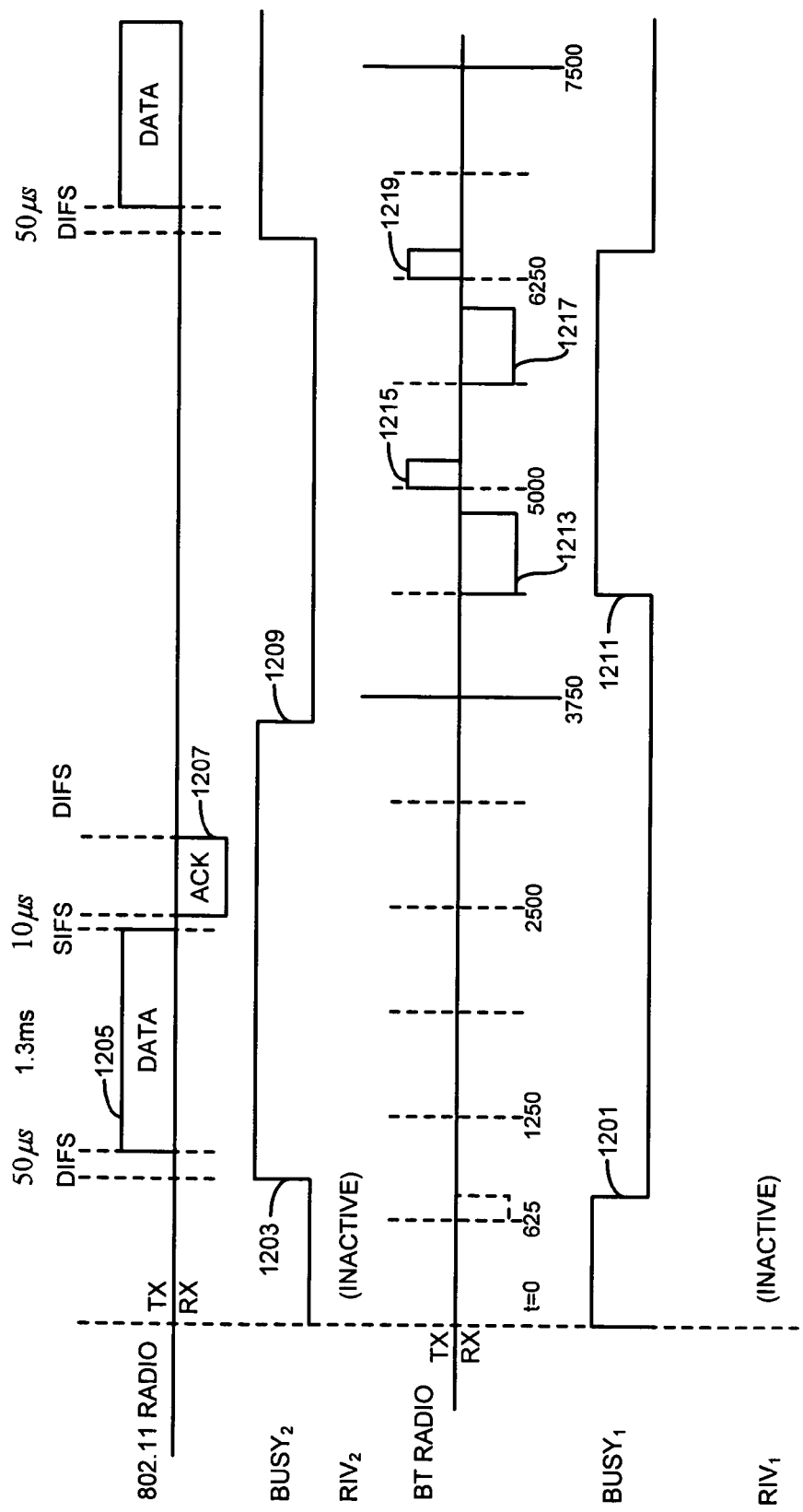
FIG. 12 is a timing diagram depicting exemplary behavior of WLAN and a co-located Bluetooth® radios engaged in best-effort traffic.

In a second example, illustrated by the timing diagram of FIG. 12, both the WLAN and Bluetooth® radios are engaged in best-effort traffic. Consequently, $RIV_1$ and $RIV_2$ are both inactive, and the WLAN and Bluetooth® radios operate on this assumption. The traffic for the WLAN radio is outgoing, while for the Bluetooth® radio, it is incoming. In addition, a slave role is assumed for the Bluetooth® radio. At the start of this example (t=0), the Bluetooth® unit is active ($BUSY_1$ is asserted) and the WLAN unit is inactive ($BUSY_2$ is non-asserted). At t=625, the Bluetooth® unit, acting as a slave, listens for a master transmission. If the header of the detected transmission indicates that this slave unit is not addressed (which is assumed to be the case in this example), the Bluetooth® unit transitions to the idle state, as indicated by $BUSY_1$ becoming non-asserted (signal transition 1201). In response, at around t=900, the WLAN radio becomes active, as indicated by $BUSY_2$ becoming asserted (signal transition 1203). The WLAN unit carries out a transaction (data transmission 1205 and receipt of ACK 1207) after which this example assumes that the WLAN unit loses access to the channel. Before becoming idle, however, the WLAN unit listens to the header of the next packet transmission to check whether it has been addressed. In this example, it has not been addressed and so becomes idle at around t=3500. This is indicated by $BUSY_2$ becoming non-asserted (signal transition 1209). As this is in the middle of a transmission time slot for the Bluetooth® slave unit, it is of no use to the Bluetooth® radio. However, since the $BUSY_2$ flag is still low at t=4375, the Bluetooth® radio can become active and so starts listening, as indicated by $BUSY_1$ transitioning to an asserted state (signal transition 1211). In this example, data is now addressed to the Bluetooth® slave and some packets are downloaded (received packet 1213, transmitted ACK 1215, received packet 1217, and transmitted ACK 1219).

The Bluetooth® radio could continue with downloading, but a timeout is desired to limit the maximum transaction time in order not to starve the WLAN radio. A similar timeout is desired on the WLAN side in order to avoid starvation of the Bluetooth® radio. Another alternative is to involve the $RIV_1$ here as well: the Bluetooth® radio could require that it become active every N slots, where N is a predetermined value such as, for example, 6. The higher the data rates on the WLAN channel, the lower impact N will have and the lower it can be chosen.

Figure 13:
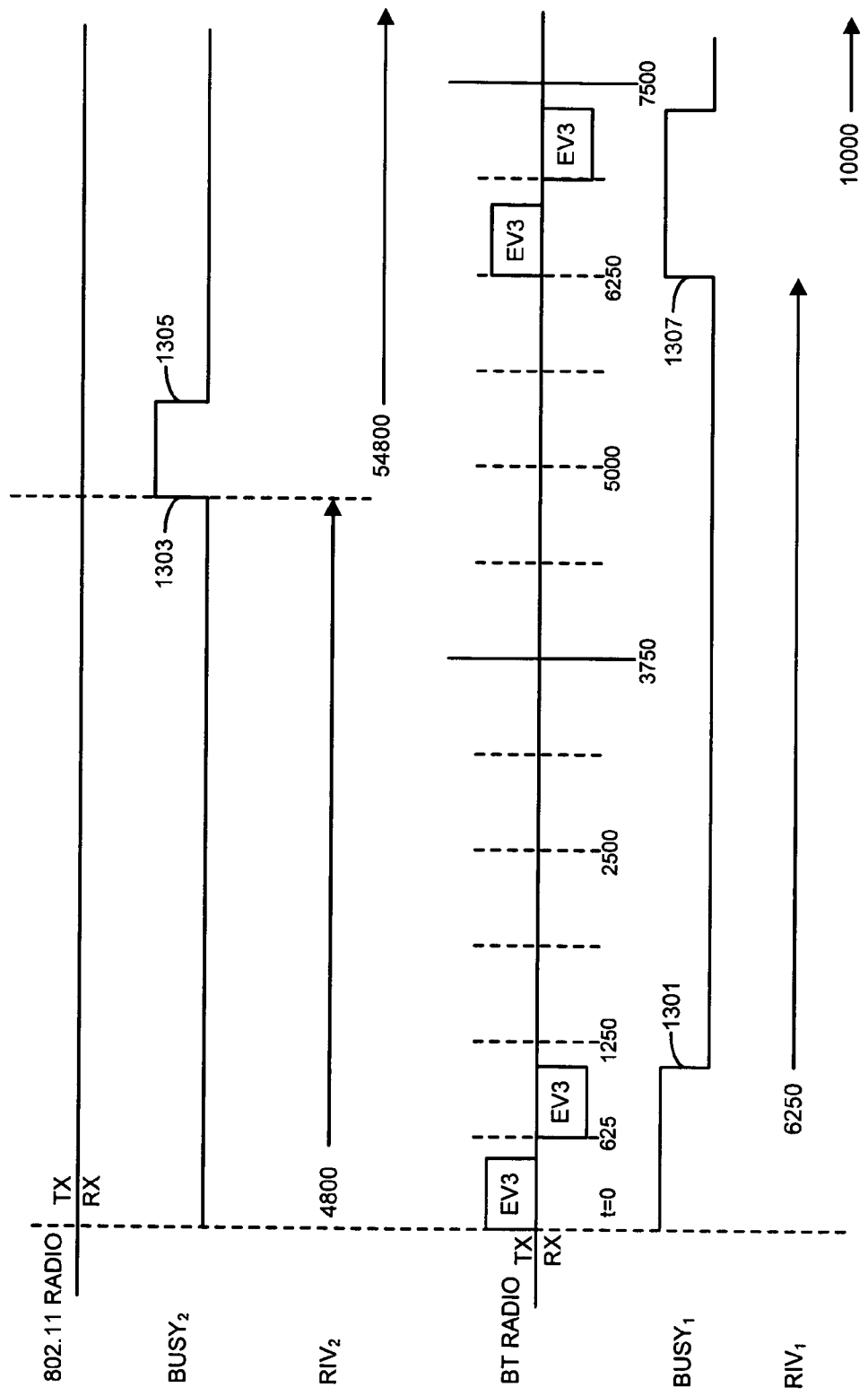
FIG. 13 is a timing diagram depicting exemplary behavior when a WLAN radio and a co-located Bluetooth® radio both deal with time critical events.

FIG. 13 is a timing diagram that depicts a third example, in which both the WLAN radio and the Bluetooth® radio deal with time critical events. Thus, both RIV signals are active in this example. It is assumed that the WLAN radio has a rather long sleep interval (e.g., 50 ms) in the power save mode. At t=0, the WLAN radio is idle ($BUSY_2$ is non-asserted) whereas the Bluetooth® unit is active ($BUSY_1$ is asserted). The timing diagram in FIG. 13 shows the occasion when the WLAN radio is about to wake up. For a long time, the $RIV_2$ value has been set at t=4800 indicating the time when a beacon from the WLAN AP will arrive. In principle, the Bluetooth® radio could remain active until that time; however, it only supports a voice link at a 30% duty cycle. After having transmitted an EV3 packet at t=0, the Bluetooth® standards would allow the Bluetooth® radio to schedule another EV3 transmission at t=3750. However, since the Bluetooth® radio knows that the transaction (i.e. the exchange of an EV3 pair) will not finish before the WLAN radio needs to become active (i.e., at t=4800), it defers from transmission. Thus, after receiving the EV3 packet transmitted at t=625, the Bluetooth® radio goes inactive. To indicate this, it sets its $BUSY_1$ flag to a non-asserted state (signal transition 1301). Also, its $RIV_1$ flag is set to a value of 6250 to indicate to the WLAN radio the latest possible moment when the Bluetooth® radio must again be able to access the channel to exchange an EV3 pair.

For a time, neither radio is active, but then at t=4800 the WLAN radio becomes active, as scheduled. This is signaled to the Bluetooth® radio by virtue of the $BUSY_2$ flag being asserted (signal transition 1303). The Bluetooth® standards would permit the Bluetooth® radio to exchange an EV3 pair at t=5000. However, since the WLAN radio is still busy at t=5000, the Bluetooth® radio will again defer transmission.

The WLAN radio must make sure that the transactions on the WLAN channel are finalized before the Bluetooth® radio needs the channel (indicated as being t=6250 by the $RIV_1$ signal). Consequently, at t=5500 the WLAN radio again becomes idle. This is signaled to the Bluetooth® radio by the $BUSY_2$ flag being set to a non-asserted state (signal transition 1305). The WLAN radio also adjusts its $RIV_2$ parameter to signal to the Bluetooth® radio that it will again require access to the channel at t=54800 (a 50 ms sleep interval was assumed).

The Bluetooth® radio could become active in response to the WLAN radio becoming idle, but it would not be able to exchange an EV3 pair at this time. Since there is nothing else for it to do, the Bluetooth® radio waits until t=6250, at which time it becomes active (as indicated by $BUSY_1$ being asserted—see signal transition 1307), and exchanges the next EV3 pair.

It will be readily apparent from the above discussion that an important difference between the herein-described sharing mechanism and conventional approaches, such as the PTA algorithm, is that in the presently-described mechanism, the time duration that each unit bases decisions on is the maximum amount of time that the co-located radio is willing to remain idle, rather than on the time duration that the co-located radio will be active. Since each radio has a notion of the idle time of the other radio, it can schedule its traffic and finish before the other radio needs to become active again.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first radio transceiver in close proximity to a second radio transceiver, the method comprising:
receiving a first signal that indicates whether the second radio transceiver is idle or busy;
receiving a second signal that, when the second radio transceiver is idle, indicates when the second radio transceiver must have access to a second channel; and
determining whether to enable the first radio transceiver to use a first channel based on at least the first signal,
wherein determining whether to enable the first radio transceiver to use the first channel based on at least the first signal comprises determining whether to enable the first radio transceiver to use the first channel based on at least the first and second signals, and
wherein determining whether to enable the first radio transceiver to use the first channel based on at least the first signal comprises:
enabling the first radio transceiver to use the first channel only when the first signal indicates that the second radio transceiver is idle and use of the first channel by the first radio transceiver will at no point be concurrent with a moment in time indicated by the second signal as being when the second radio transceiver must have access to the second channel.

2. The method of claim 1, wherein the first channel and the second channel occupy a same radio frequency spectrum.

3. The method of claim 2, wherein the first channel and the second channel are the same as one another.

4. The method of claim 1, wherein the second signal specifies a first future value of a clock.

5. The method of claim 1, wherein the second signal specifies a first time offset value.

6. The method of claim 1, wherein:
the first radio transceiver operates in accordance with a first standard; and
the second radio transceiver operates in accordance with a second standard.

7. The method of claim 6, wherein the first standard is a standard for Bluetooth® wireless technology and the second standard is a standard for WLAN 802.11 technology.

8. The method of claim 1, comprising:
in response to detecting that the first signal indicates that the second radio transceiver is idle, determining whether the second signal should be considered when determining whether to enable the first radio transceiver to use the first channel.

9. The method of claim 1, further comprising:
generating a third signal that indicates whether the first radio transceiver is idle or busy.

10. A method of operating a first radio transceiver in close proximity to a second radio transceiver, the method comprising:
receiving a first signal that indicates whether the second radio transceiver is idle or busy;
receiving a second signal that, when the second radio transceiver is idle, indicates when the second radio transceiver must have access to a second channel;
determining whether to enable the first radio transceiver to use a first channel based on at least the first signal; and
relinquishing access to the first channel;
generating a third signal that indicates that the first radio transceiver is idle; and
prior to a time indicated by the fourth signal as being when the first radio transceiver must have access to the first channel, detecting that the first signal indicates that the second radio transceiver is idle, and in response thereto performing:
ensuring that the third signal indicates that the first radio transceiver is busy; and
enabling the first radio transceiver to access the first channel.

11. A method of operating a first radio transceiver in close proximity to a second radio transceiver, the method comprising:
receiving a first signal that indicates whether the second radio transceiver is idle or busy;
receiving a second signal that, when the second radio transceiver is idle, indicates when the second radio transceiver must have access to a second channel;
determining whether to enable the first radio transceiver to use a first channel based on at least the first signal;
generating a third signal that indicates that the first radio transceiver is busy;
enabling the first radio transceiver to utilize the first channel; and
detecting that further use of the first channel by the first radio transceiver cannot be completed before a moment in time indicated by a second signal as being when the second radio transceiver must have access to the second channel, and in response to said detection, performing:
relinquishing access to the first channel;
ensuring that the third signal indicates that the first radio transceiver is idle; and
generating a fourth signal that indicates when the first radio transceiver must again have access to the first channel.

12. A method of operating a first radio transceiver in close proximity to a second radio transceiver, the method comprising:
receiving a first signal that indicates whether the second radio transceiver is idle or busy;
receiving a second signal that, when the second radio transceiver is idle, indicates when the second radio transceiver must have access to a second channel;
determining whether to enable the first radio transceiver to use a first channel based on at least the first signal; and
in response to detecting that the first signal indicates that the second radio transceiver is idle, determining whether the second signal should be considered when determining whether to enable the first radio transceiver to use the first channel,
wherein determining whether the second signal should be considered when determining whether to enable the first radio transceiver to use the first channel comprises comparing the second signal to a predetermined value.

13. A method of operating a first radio transceiver in close proximity to a second radio transceiver, the method comprising: receiving a first signal that indicates whether the second radio transceiver is idle or busy; receiving a second signal that, when the second radio transceiver is idle, indicates when the second radio transceiver must have access to a second channel;
   determining whether to enable the first radio transceiver to use a first channel based on at least the first signal; and
   in response to detecting that the first signal indicates that the second radio transceiver is idle, determining whether the second signal should be considered when determining whether to enable the first radio transceiver to use the first channel,
   wherein determining whether the second signal should be considered when determining whether to enable the first radio transceiver to use the first channel comprises:
   receiving an active-indicating signal that indicates whether the second signal is active; and
   using the active-indicating signal as an indicator of whether the second signal should be considered when determining whether to enable the first radio transceiver to use the first channel.

14. A method of operating a first radio transceiver in close proximity to a second radio transceiver, the method comprising:
   receiving a first signal that indicates whether the second radio transceiver is idle or busy;
   receiving a second signal that, when the second radio transceiver is idle, indicates when the second radio transceiver must have access to a second channel;
   determining whether to enable the first radio transceiver to use a first channel based on at least the first signal;
   in response to detecting that the first signal indicates that the second radio transceiver is idle, determining whether the second signal should be considered when determining whether to enable the first radio transceiver to use the first channel; and
   in response to determining that the second signal should not be considered when determining whether to enable the first radio transceiver to use the first channel, using a timer to determine when the first radio transceiver will relinquish use of the first channel.

15. A method of operating a first radio transceiver in close proximity to a second radio transceiver, the method comprising:
   receiving a first signal that indicates whether the second radio transceiver is idle or busy;
   receiving a second signal that, when the second radio transceiver is idle, indicates when the second radio transceiver must have access to a second channel;
   determining whether to enable the first radio transceiver to use a first channel based on at least the first signal; and
   generating a third signal that indicates whether the first transceiver is idle or busy; and
   in response to the first radio transceiver being idle while engaged in best-effort traffic, indicating to the second radio transceiver that a fourth signal is not active, wherein when the first radio transceiver is idle, the fourth signal, when active, indicates when the first radio transceiver must have access to a first channel.

16. A method of operating a first radio transceiver in close proximity to a second radio transceiver, the method comprising:
   receiving a first signal that indicates whether the second radio transceiver is idle or busy;
   receiving a second signal that, when the second radio transceiver is idle, indicates when the second radio transceiver must have access to a second channel;
   determining whether to enable the first radio transceiver to use a first channel based on at least the first signal;
   generating a third signal that indicates whether the first transceiver is idle or busy; and
   generating a fourth signal that, when the first radio transceiver is idle, indicates when the first radio transceiver must have access to a first channel,
   wherein:
      the first radio transceiver is engaged in communication of isochronous traffic that permits each data exchange to occur at any of a predetermined plurality of moments within a corresponding window of time; and
      generating the fourth signal includes determining when a last occurring one of the predetermined plurality of moments within an upcoming window of time will occur.

17. The method of claim 16, comprising:
   detecting that the first signal indicates that the second radio transceiver is busy, and in response thereto remaining idle during a non-last occurring one of the predetermined plurality of moments within the upcoming window of time; and
   in a subsequently occurring one of the predetermined plurality of moments within the upcoming window of time, carrying out a data exchange in accordance with one or more predefined retransmission procedures.

18. A controller for operating a first radio transceiver in close proximity to a second radio transceiver, the controller comprising:
   logic that receives a first signal that indicates whether the second radio transceiver is idle or busy;
   logic that receives a second signal that, when the second radio transceiver is idle, indicates when the second radio transceiver must have access to a second channel; and
   logic that determines whether to enable the first radio transceiver to use a first channel based on at least the first signal,
   wherein the logic that determines whether to enable the first radio transceiver to use the first channel based on at least the first signal comprises logic that determines whether to enable the first radio transceiver to use the first channel based on at least the first and second signals, and
   wherein the logic that determines whether to enable the first radio transceiver to use the first channel based on at least the first signal comprises:
   logic that enables the first radio transceiver to use the first channel only when the first signal indicates that the second radio transceiver is idle and use of the first channel by the first radio transceiver will at no point be concurrent with a moment in time indicated by the second signal as being when the second radio transceiver must have access to the second channel.

19. The controller of claim 18, wherein the first channel and the second channel occupy a same radio frequency spectrum.

20. The controller of claim 19, wherein the first channel and the second channel are the same as one another.

21. The controller of claim 18, wherein the second signal specifies a first future value of a clock.

22. The controller of claim 18, wherein the second signal specifies a first time offset value.

23. The controller of claim 18, wherein:
the first radio transceiver operates in accordance with a first standard; and
the second radio transceiver operates in accordance with a second standard.

24. The controller of claim 23, wherein the first standard is a standard for Bluetooth® wireless technology and the second standard is a standard for WLAN 802.11 technology.

25. The controller of claim 18, comprising:
logic that, in response to detecting that the first signal indicates that the second radio transceiver is idle, determines whether the second signal should be considered when determining whether to enable the first radio transceiver to use the first channel.

26. The controller of claim 18, further comprising:
logic that generates a third signal that indicates whether the first radio transceiver is idle or busy.

27. A controller for operating a first radio transceiver in close proximity to a second radio transceiver, the controller comprising:
logic that receives a first signal that indicates whether the second radio transceiver is idle or busy;
logic that receives a second signal that, when the second radio transceiver is idle, indicates when the second radio transceiver must have access to a second channel;
logic that determines whether to enable the first radio transceiver to use a first channel based on at least the first signal;
logic that relinquishes access to the first channel;
logic that generates a third signal that indicates that the first radio transceiver is idle; and
logic that, prior to a time indicated by the fourth signal as being when the first radio transceiver must have access to the first channel, detects that the first signal indicates that the second radio transceiver is idle, and in response thereto performs:
ensuring that the third signal indicates that the first radio transceiver is busy; and
enabling the first radio transceiver to access the first channel.

28. A controller for operating a first radio transceiver in close proximity to a second radio transceiver, the controller comprising:
logic that receives a first signal that indicates whether the second radio transceiver is idle or busy;
logic that receives a second signal that, when the second radio transceiver is idle, indicates when the second radio transceiver must have access to a second channel;
logic that determines whether to enable the first radio transceiver to use a first channel based on at least the first signal;
logic that generates a third signal that indicates that the first radio transceiver is busy;
logic that enables the first radio transceiver to utilize the first channel; and
logic that detects that further use of the first channel by the first radio transceiver cannot be completed before a moment in time indicated by a second signal as being when the second radio transceiver must have access to the second channel, and in response to said detection, performs:
relinquishing access to the first channel;
ensuring that the third signal indicates that the first radio transceiver is idle; and
generating a fourth signal that indicates when the first radio transceiver must again have access to the first channel.

29. A controller for operating a first radio transceiver in close proximity to a second radio transceiver, the controller comprising:
logic that receives a first signal that indicates whether the second radio transceiver is idle or busy;
logic that receives a second signal that, when the second radio transceiver is idle, indicates when the second radio transceiver must have access to a second channel;
logic that determines whether to enable the first radio transceiver to use a first channel based on at least the first signal; and
logic that, in response to detecting that the first signal indicates that the second radio transceiver is idle, determines whether the second signal should be considered when determining whether to enable the first radio transceiver to use the first channel,
wherein the logic that determines whether the second signal should be considered when determining whether to enable the first radio transceiver to use the first channel comprises logic that compares the second signal to a predetermined value.

30. A controller for operating a first radio transceiver in close proximity to a second radio transceiver, the controller comprising:
logic that receives a first signal that indicates whether the second radio transceiver is idle or busy;
logic that receives a second signal that, when the second radio transceiver is idle, indicates when the second radio transceiver must have access to a second channel;
logic that determines whether to enable the first radio transceiver to use a first channel based on at least the first signal; and
logic that, in response to detecting that the first signal indicates that the second radio transceiver is idle, determines whether the second signal should be considered when determining whether to enable the first radio transceiver to use the first channel,
wherein the logic that determines whether the second signal should be considered when determining whether to enable the first radio transceiver to use the first channel comprises:
logic that uses an active-indicating signal as an indicator of whether the second signal should be considered when determining whether to enable the first radio transceiver to use the first channel, wherein the active-indicating signal indicates whether the second signal is active.

31. A controller for operating a first radio transceiver in close proximity to a second radio transceiver, the controller comprising:
logic that receives a first signal that indicates whether the second radio transceiver is idle or busy;
logic that receives a second signal that, when the second radio transceiver is idle, indicates when the second radio transceiver must have access to a second channel;
logic that determines whether to enable the first radio transceiver to use a first channel based on at least the first signal;
logic that, in response to detecting that the first signal indicates that the second radio transceiver is idle, determines whether the second signal should be considered when determining whether to enable the first radio transceiver to use the first channel; and
logic that, in response to determining that the second signal should not be considered when determining whether to enable the first radio transceiver to use the first channel, uses a timer to determine when the first radio transceiver will relinquish use of the first channel.

32. A controller for operating a first radio transceiver in close proximity to a second radio transceiver, the controller comprising:
  logic that receives a first signal that indicates whether the second radio transceiver is idle or busy;
  logic that receives a second signal that, when the second radio transceiver is idle, indicates when the second radio transceiver must have access to a second channel;
  logic that determines whether to enable the first radio transceiver to use a first channel based on at least the first signal;
  logic that generates a third signal that indicates whether the first transceiver is idle or busy; and
  logic that, in response to the first radio transceiver being idle while engaged in best-effort traffic, indicates to the second radio transceiver that a fourth signal is not active, wherein when the first radio transceiver is idle, the fourth signal, when active, indicates when the first radio transceiver must have access to a first channel.

33. A controller for operating a first radio transceiver in close proximity to a second radio transceiver, the controller comprising:
  logic that receives a first signal that indicates whether the second radio transceiver is idle or busy;
  logic that receives a second signal that, when the second radio transceiver is idle, indicates when the second radio transceiver must have access to a second channel;
  logic that determines whether to enable the first radio transceiver to use a first channel based on at least the first signal;
  logic that generates a third signal that indicates whether the first transceiver is idle or busy; and
  logic that generates a fourth signal that, when the first radio transceiver is idle, indicates when the first radio transceiver must have access to a first channel,
  wherein:
    the first radio transceiver is engaged in communication of isochronous traffic that permits each data exchange to occur at any of a predetermined plurality of moments within a corresponding window of time; and
    the logic that generates the fourth signal includes logic that determines when a last occurring one of the predetermined plurality of moments within an upcoming window of time will occur.

34. The controller of claim 33, comprising:
  logic that detects that the first signal indicates that the second radio transceiver is busy, and in response thereto causes the first radio transceiver to remain idle during a non-last occurring one of the predetermined plurality of moments within the upcoming window of time; and
  logic that causes a data exchange in a subsequently occurring one of the predetermined plurality of moments within the upcoming window of time to be carried out in accordance with one or more predefined retransmission procedures.

35. An apparatus comprising:
  a first radio transceiver comprising a first controller; and
  a second radio transceiver comprising a second controller, wherein:
  the first controller comprises:
    logic that receives a first signal that indicates whether the second radio transceiver is idle or busy;
    logic that receives a second signal that, when the second radio transceiver is idle, indicates when the second radio transceiver must have access to a second channel; and
    logic that determines whether to enable the first radio transceiver to use a first channel based on at least the first signal,
    wherein the logic that determines whether to enable the first radio transceiver to use the first channel based on at least the first signal comprises logic that determines whether to enable the first radio transceiver to use the first channel based on at least the first and second signals; and
    wherein the logic that determines whether to enable the first radio transceiver to use the first channel based on at least the first signal comprises:
      logic that enables the first radio transceiver to use the first channel only when the first signal indicates that the second radio transceiver is idle and use of the first channel by the first radio transceiver will at no point be concurrent with a moment in time indicated by the second signal as being when the second radio transceiver must have access to the second channel; and
  the second controller comprises:
    logic that generates the first signal; and
    logic that generates the second signal.

36. The apparatus of claim 35, wherein the logic that determines whether to enable the first radio transceiver to use the first channel based on at least the first signal comprises logic that determines whether to enable the first radio transceiver to use the first channel based on at least the first and second signals.

37. A computer readable medium having stored thereon a set of one or more program instructions for causing one or more processors to operate a first radio transceiver in close proximity to a second radio transceiver, the set of one or more program instructions causing the processor to perform:
  receiving a first signal that indicates whether the second radio transceiver is idle or busy;
  receiving a second signal that, when the second radio transceiver is idle, indicates when the second radio transceiver must have access to a second channel; and
  determining whether to enable the first radio transceiver to use a first channel based on at least the first signal,
  wherein determining whether to enable the first radio transceiver to use the first channel based on at least the first signal comprises determining whether to enable the first radio transceiver to use the first channel based on at least the first and second signals; and
  wherein determining whether to enable the first radio transceiver to use the first channel based on at least the first signal comprises:
  enabling the first radio transceiver to use the first channel only when the first signal indicates that the second radio transceiver is idle and use of the first channel by the first radio transceiver will at no point be concurrent with a moment in time indicated by the second signal as being when the second radio transceiver must have access to the second channel.

* * * * *